United States Patent
Tamez

[19]

[11] Patent Number: 6,115,972

[45] Date of Patent: Sep. 12, 2000

[54] STRUCTURE STABILIZATION SYSTEM

[76] Inventor: Federico Garza Tamez, Rio Tamesi #305, Colonia Mexico, Monterrey, N.L., C.P. 64740, Mexico

[21] Appl. No.: 08/892,791

[22] Filed: Jul. 11, 1997

Related U.S. Application Data

[63] Continuation-in-part of application No. 08/629,601, Apr. 9, 1996, Pat. No. 5,797,227.

[51] Int. Cl.$^7$ .................................. E04B 1/98; E04H 9/02
[52] U.S. Cl. .................... 52/167.4; 52/167.1; 248/181.1; 248/188.4; 248/566; 248/573; 248/581
[58] Field of Search ................................ 52/167.1, 167.4; 248/181.1, 188.2, 188.4, 561, 566, 573, 581

[56] References Cited

U.S. PATENT DOCUMENTS

| | | |
|---|---|---|
| 99,973 | 2/1870 | Touaillon . |
| 929,542 | 7/1909 | Boermel . |
| 1,761,321 | 6/1930 | Wells . |
| 1,761,322 | 6/1930 | Wells . |
| 2,001,169 | 5/1935 | Wallace . |
| 2,014,643 | 9/1935 | Bakker . |
| 2,208,872 | 7/1940 | Ropp . |
| 2,705,928 | 4/1955 | Pont . |
| 2,828,589 | 4/1958 | Hercik . |
| 2,950,576 | 8/1960 | Rubenstein . |
| 3,110,464 | 11/1963 | Baratoff et al. . |
| 3,129,531 | 4/1964 | Connor . |
| 3,347,002 | 10/1967 | Penkuhn . |
| 3,418,768 | 12/1968 | Cardan . |
| 3,529,919 | 9/1970 | Tirapolsky et al. . |
| 3,538,653 | 11/1970 | Meckler . |
| 3,632,077 | 1/1972 | Hall et al. . |
| 3,638,377 | 2/1972 | Caspe . |

(List continued on next page.)

FOREIGN PATENT DOCUMENTS

| | | |
|---|---|---|
| 872117 | 6/1971 | Canada . |
| 915353 | 11/1972 | Canada . |
| 0079048 | 5/1983 | European Pat. Off. . |
| 3200815 | 7/1983 | Germany . |
| 376615 | 4/1973 | U.S.S.R. . |

OTHER PUBLICATIONS

Investigation of Seismic Base Isolation System Based on Pendular Action, *Civil Engineering Studies*, Structural Research Series No. 578, Aug. 1993, UILU–ENE–93–2001, ISSN: 0069–4274.

SKF Plain Bearings Brochure, pp. 101, 102, 106.

Seismic Isolation of the Reforma Newspaper Printing Press Vane in Mexico City, Aug. 1994.

Garza Tamez et al., "Test Results and Implementation of Seismic Base Isolation System Based on Pendular Action," *Proceedings, vol. 1*, Second International Conference on Motion and Vibration Control, Aug. 30–Sep. 3, 1994, Yokohama, Japan, Ed. by Yoshida and K. Nonami, pp. 1–6.

U.S. application No. 08/629,601, Garza–Tamez, filed Apr. 9, 1996.

*Primary Examiner*—Carl D. Friedman
*Assistant Examiner*—Yvonne M. Horton
*Attorney, Agent, or Firm*—Staas & Halsey LLP

[57] ABSTRACT

A stabilization system protects a structural member from the effects of seismic disturbances. Pendular isolators are positioned between a structure fixed to the ground and the structural member, which is movable and which is sought to be protected, such as a complete building, a building slab upon which sensitive equipment is used, or a bridge deck. The pendular isolators can be rods extending between the building and the slab floor, wherein ends of rods connected to the slab floor include a spherical friction knuckle joint or bearing, i.e., knuckle element/socket assembly. Alternatively, each pendular isolator can be a set of supports movable relative to each other and connected by at least one rod having a knuckle joint at each end thereof. The friction at the knuckle joint is utilized to provide a damping of the seismic disturbance, thereby permitting only limited relative movement between the fixed structure and the movable structural member in the event of a seismic disturbance. The lengths of the pendular isolators are adjustable.

40 Claims, 18 Drawing Sheets

U.S. PATENT DOCUMENTS

| | | |
|---|---|---|
| 3,726,986 | 4/1973 | Higaki et al. . |
| 3,730,463 | 5/1973 | Richard . |
| 3,731,898 | 5/1973 | Smith . |
| 3,762,114 | 10/1973 | Eskijian . |
| 3,789,174 | 1/1974 | Barkan et al. . |
| 3,796,017 | 3/1974 | Meckler . |
| 3,940,895 | 3/1976 | Yamamoto et al. . |
| 3,973,078 | 8/1976 | Wolf et al. . |
| 3,977,140 | 8/1976 | Matsudaira et al. . |
| 3,986,367 | 10/1976 | Kalpins . |
| 4,033,566 | 7/1977 | Petersen . |
| 4,042,651 | 8/1977 | Gaurois . |
| 4,166,344 | 9/1979 | Ikonomou . |
| 4,188,681 | 2/1980 | Tada et al. . |
| 4,209,868 | 7/1980 | Tada et al. . |
| 4,266,379 | 5/1981 | Valencia Aguilar . |
| 4,320,549 | 3/1982 | Greb . |
| 4,328,648 | 5/1982 | Kalpins . |
| 4,371,143 | 2/1983 | Ishida et al. . |
| 4,389,141 | 6/1983 | Cumings . |
| 4,496,130 | 1/1985 | Toyama . |
| 4,514,942 | 5/1985 | Pocanschi . |
| 4,517,778 | 5/1985 | Nicolai . |
| 4,554,767 | 11/1985 | Ikonomou . |
| 4,574,540 | 3/1986 | Shiau . |
| 4,587,773 | 5/1986 | Valencia . |
| 4,644,714 | 2/1987 | Zayas . |
| 4,662,142 | 5/1987 | Weiner . |
| 4,700,932 | 10/1987 | Katsuno . |
| 4,726,161 | 2/1988 | Yaghoubian . |
| 4,766,706 | 8/1988 | Caspe . |
| 4,766,708 | 8/1988 | Sing . |
| 4,793,105 | 12/1988 | Caspe . |
| 4,799,339 | 1/1989 | Kobori et al. . |
| 4,860,507 | 8/1989 | Garza-Tamez . |
| 4,881,350 | 11/1989 | Wu . |
| 4,883,250 | 11/1989 | Yano et al. . |
| 4,887,788 | 12/1989 | Fischer et al. . |
| 4,922,671 | 5/1990 | Sato . |
| 4,924,639 | 5/1990 | Sato et al. . |
| 4,924,640 | 5/1990 | Suizu et al. . |
| 4,956,947 | 9/1990 | Middleton . |
| 4,972,636 | 11/1990 | Noji et al. . |
| 4,974,378 | 12/1990 | Shustov . |
| 5,005,326 | 4/1991 | Ishimaru et al. . |
| 5,035,394 | 7/1991 | Haak . |
| 5,071,261 | 12/1991 | Stuve . |
| 5,107,634 | 4/1992 | Onoda et al. . |
| 5,152,110 | 10/1992 | Garza-Tamez . |
| 5,168,673 | 12/1992 | Nemir et al. . |
| 5,168,967 | 12/1992 | Abiru et al. . |
| 5,182,887 | 2/1993 | Uno et al. . |
| 5,233,797 | 8/1993 | Uno et al. . |
| 5,239,789 | 8/1993 | Uno et al. . |
| 5,255,764 | 10/1993 | Kurabayashi et al. . |
| 5,259,159 | 11/1993 | Kawase et al. . |
| 5,265,387 | 11/1993 | Ishimaru et al. . |
| 5,288,060 | 2/1994 | Tyutinman . |
| 5,310,156 | 5/1994 | Matsumura et al. . |
| 5,311,709 | 5/1994 | Kobari et al. . |
| 5,442,883 | 8/1995 | Nishimura et al. . |
| 5,452,548 | 9/1995 | Kwon . |
| 5,505,026 | 4/1996 | Fausto . |
| 5,526,609 | 6/1996 | Lee et al. . |
| 5,533,307 | 7/1996 | Tsai et al. . |
| 5,544,451 | 8/1996 | Cheng et al. . |
| 5,544,452 | 8/1996 | Fujita et al. . |

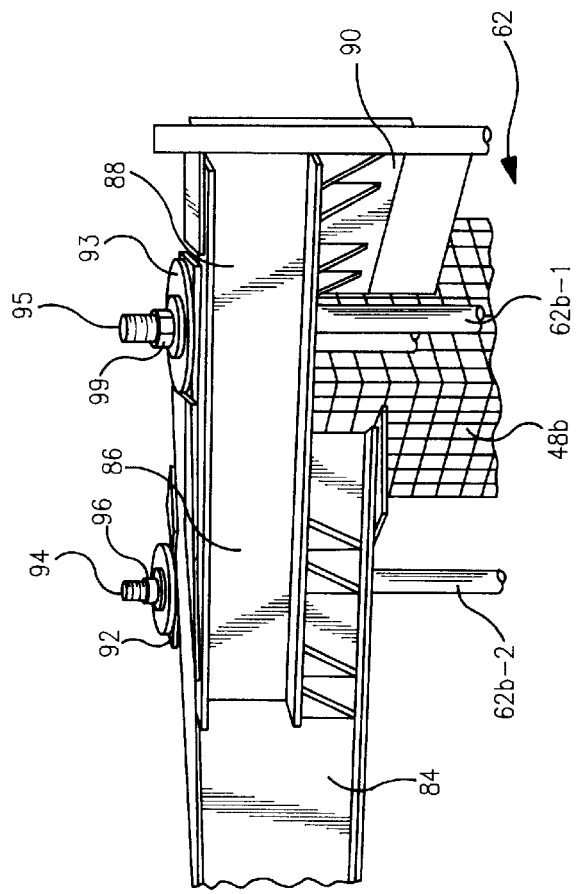
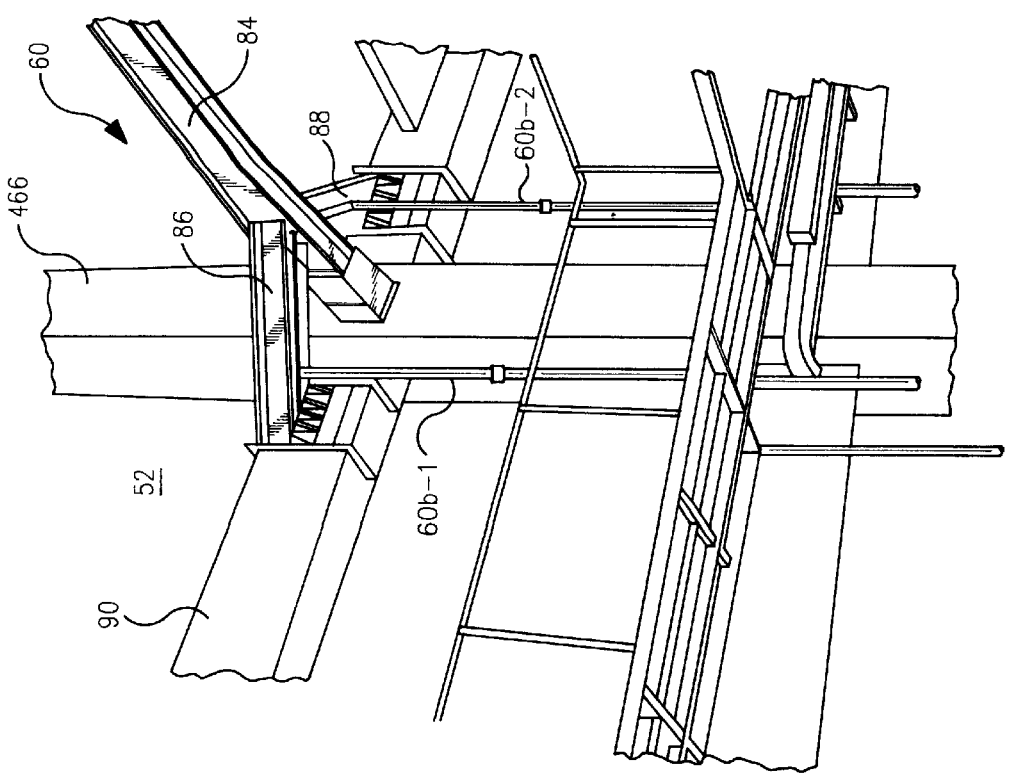
FIG. 5
FIG. 4

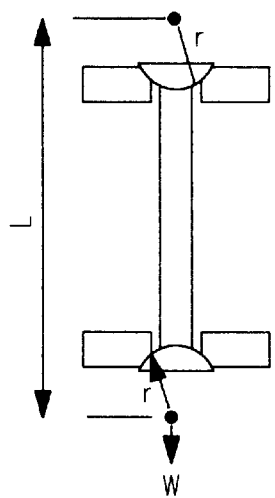 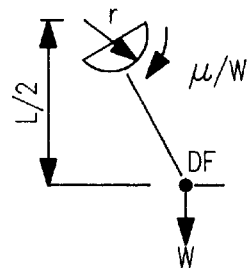
FIG. 8A  FIG. 8B
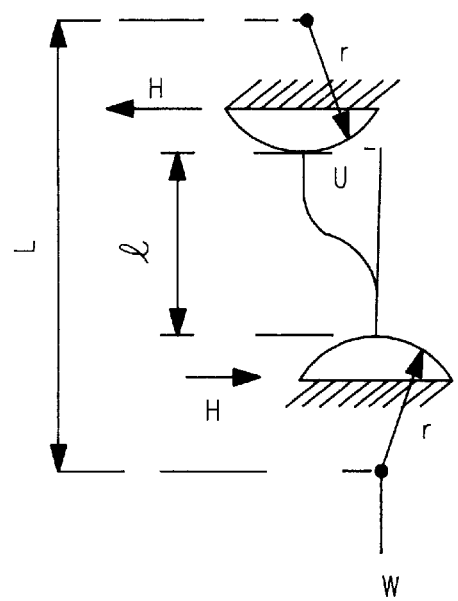
FIG. 9

STRUCTURE STABILIZATION SYSTEM

CROSS REFERENCE TO RELATED APPLICATION

This application is a continuation-in-part of co-pending U.S. application Ser. No. 08/629,601, filed Apr. 9, 1996, and entitled "STRUCTURE STABILIZATION now U.S. Pat. No. 5,797,227." The disclosure thereof is incorporated herein by reference.

BACKGROUND OF THE INVENTION

This invention relates to a system for protecting structures, e.g., buildings, bridges and machines such as printing presses, from the effects of seismic disturbances and, more particularly, to a pendular, friction-based system affording improved damping of seismic disturbance forces.

With reference to FIG. 1 herein, U.S. Pat. No. 4,860,507 of the present inventor (hereinafter "the '507 patent") discloses a stabilization system 10 for protecting a structure 12, e.g., a building, from effects of seismic disturbances. The stabilization system 10 includes a base isolation system 14 employing vertical support columns 15, suspended by flexible elements from corresponding bases 16. This system 14 provides "floating" support of the structure 12 relative to its foundation 18, thereby minimizing horizontal movement transmission from the ground, during a seismic event, to the structure 12. A releasable interlock system 20 and a damping subsystem 22 are employable independently of, and/or in combination with, this base isolation system 14. More particularly, the releasable interlock system 20 normally secures the structure 12 to its foundation 18 against linear displacements below a predetermined threshold level. The system 20, however, has an automatic release mechanism responding to forces above the threshold, as may be produced by a seismic disturbance. These forces automatically unlock the structure 12 and permit same to "float", supported by the base isolation system 14.

The damping subsystem 22, on the other hand, employs hydraulically interconnected hydraulic dampers 24, 26, arranged as one or more pairs. Each pair contributes to providing suitable damping of linear relative displacement between the structure 12 and its foundation 18. These dampers, it has been found, may help create, due to their arrangement, a tendency for the structure to gyrate about a vertical axis relative to its foundation, but also serve to impede this gyration, once created.

U.S. Patent No. 5,152,110 of the present inventor (hereinafter "the '110 patent") further discloses an improved damping subsystem employing hydraulic dampers of "L-shaped" configuration which provide a hydraulic parallel-to-perpendicular force, or displacement, transformation. Each L-shaped damper has first and second integral, angularly related damper components. Remote subchambers of the damper components are hydraulically connected via a valved conduit, and adjacent subchambers are directly connected hydraulically. The valve is adjustable, to produce a desired level of damping.

The disclosures of the '507 and '110 patents are expressly incorporated herein by reference and effectively as though each was directly incorporated herein in its entirety.

In the present inventor's U.S Pat. No. 5,797,277, there is described a base isolation system including a support frame assemblage of a plurality of vertical support columns arranged in a pair of parallel (longitudinal) rows and secured to the earth (e.g., by pilings). The respective vertical support columns of the parallel rows are disposed in paired, spaced relationship; longitudinal support beams interconnect the respective columns of each row, and transverse (or lateral) support beams extend between and interconnect the paired columns of the parallel rows.

A support slab having parallel longitudinal edges is disposed in spaced, parallel relation between the parallel rows of vertical support columns and the associated, longitudinally extending support beams, so as to extend in parallel therewith in the longitudinal direction. Elongated pendulum arms, e.g., solid core steel rods, are engaged at upper ends thereof to upper portions of the vertical support columns and at lower ends thereof to the slab, affording a pendulum-type suspension of the slab from the vertical support columns. This arrangement is analogous to the pendulum-type "floating" suspension of the building as taught by the '507 patent. Furthermore, a hydraulic damping system using orifice plugs interconnects the slab to the supporting foundation to which the vertical support columns are connected.

The rods have knuckle joints including a hemispherical, convex knuckle element functioning as a dry bearing surface in frictional engagement within a corresponding concave socket. The rods have threaded ends which are inserted through supports and receive nuts thereon. Adjustment of a nut adjusts the length of the rod.

The knuckle element is movable within its corresponding socket, so that the slab may float relatively to, and thereby be isolated from, the support columns and related support structures which are subject to movement during seismic disturbances. This frictional engagement is described in U.S. Pat. No. 5,797,227 as supplementing the damping effects of the hydraulic damping system, but only after a small displacement of the slab relatively to the vertical support columns and thus relative gyration of the rod ends, or knuckles, within the corresponding sockets defining the bearings, i.e. after such relative displacement or movement overcomes an initial dynamic friction at the bearings.

There remains a continuing need for improvements in such systems to enhance the effectiveness of same and to broaden the range of applications in which they may be employed, while simplifying the implementation of same as well. For example, it is highly desirable to provide a structure stabilization system for protecting machinery, such as a printing press, from seismic disturbances, where the printing press is to be installed and operated in a pre-existing building which has no, or inadequate, seismic protection; it is also desirable to protect such equipment without having to significantly modify the building or any existing base isolation system, both as a matter of convenience and to assure that a unitary, or integral, support structure is afforded.

It is also desired that a potential relative gyration between the building and foundation not be created, due to the character of a base isolation system, in the event of a seismic disturbance. More particularly, as noted above, as hydraulic dampers may actually contribute to the creation of forces tending to gyrate the building relatively to its foundation, a damping system which does not rely upon such hydraulic dampers is also desired.

Eliminating a hydraulic damper-based system could also lead to a less complex, less expensive, lower maintenance and higher dependability system for protecting a structure from seismic disturbances.

It is also desired to have a relatively simple device for isolating a structure, such as a bridge deck, from seismic disturbances experienced by the bridge's piers. For optimum efficiency and performance, such device should be capable of use in new construction or in retrofitting an existing bridge, should be adjustable to compensate for ground settling, should be maintenance free, and should not contribute to torsional forces which might tend to gyrate the bridge deck.

SUMMARY OF THE INVENTION

Accordingly, it is an object of the present invention to provide an improved stabilization system for protecting structures from the effects of seismic disturbances.

It is another object of the invention to provide a stabilization system affording floating support of a structural member relative to an isolated, or a non-isolated, structure.

It is also an object of the present invention to provide a structure stabilization system that is less complex, more reliable, and lower in cost and maintenance than prior art systems.

Still a further object of the present invention is to provide an improved pendulum-type floating support system inherently incorporating damping.

It is another object of the present invention to provide effective structural damping using solely pendular isolators, each including a knuckle joint permitting elimination of hydraulic dampers.

It is also an object of the present invention to provide a stabilization system relying solely upon friction to dampen the effects of seismic disturbance on a building.

It is still another object of the present invention to provide a base isolation system relying upon maintenance-free spherical plain thrust bearings as the sole damping device.

Yet another object of the invention is to provide a pendulum-type, friction-based, floating support for sensitive machinery thereby protecting such machinery from damage due to seismic disturbances.

It is another object of the present invention to provide a plurality of pendulum rods supporting a structure, the rods terminating in knuckle assemblies serving as the sole damping elements of the system.

It is also an object of the present invention to provide a structure stabilization system relying upon knuckle damping pendular isolators, each having an axial knuckle joint integrated by two parts: a convex, hemispherical knuckle element, and a matching concave socket.

It is another object to dampen seismic effects via a device employing knuckle joints at ends of a rod, said knuckle joints being selected according to radius and coefficient of friction, in order to obtain the optimum damping force for each pendular isolation application.

Finally, it is an object of the invention to provide a system for monitoring relative height positions of the structural member sought to be protected, thereby to detect any misalignment conditions which have arisen, e.g., due to settlement of the foundation and, further, to enable correction of any such detected misalignment or other instability conditions.

In determining the damping force for the base isolation system of the equipment supporting slab described in U.S. Pat. No. 5,797,227, the presence of knuckle joint friction forces was recognized and taken into consideration in the context of it being a force that had to be overcome, e.g. the plug orifice size had to be increased. After additional testing, however, the possibility of actually relying upon only these knuckle joint friction forces for damping control was considered for the first time. Thus, the present invention arose out of the inventor becoming aware of the fact that the intensity of friction forces of the knuckle joints could be varied and controlled at will to provide effective damping.

To achieve the above and other objects of the present invention, there is provided a structure stabilization system including a knuckle damping bilinear isolation pendular system based on pendular isolators positioned between a structure connected to the ground, and a structure which is sought to be protected. The system relies upon friction created at a knuckle joint, i.e., at an interface of a spherical knuckle element and a corresponding socket to dampen the effects of the seismic disturbances.

In one embodiment the invention includes a support frame assemblage of a plurality of vertical support columns arranged in a pair of parallel (longitudinal) rows and secured to the earth (e.g., such as by pilings). The respective vertical support columns of the parallel rows are disposed in paired, spaced relationship; longitudinal support beams interconnect the respective columns of each row and transverse (or lateral) support beams extend between and interconnect the paired columns of the parallel rows.

A support slab is disposed between the parallel rows of vertical support columns and the associated, longitudinally extending support beams, so as to extend in parallel therewith in the longitudinal direction with the parallel longitudinal edges of the slab spaced from the columns by a distance at least as great as, but not significantly exceeding, the likely distance of lateral travel, or relative displacement, of the slab in the event of a seismic disturbance.

The slab is supported via the knuckle damping pendular isolators which, in the preferred embodiment, are solid core steel rods, engaged at upper ends thereof to the support beams connected to the vertical support columns, and at lower ends thereof to the slab, affording a pendulum-type suspension of the slab from the vertical support columns. The vertical support columns extend above the slab to a distance at least as great as the required free suspension length of the pendulums. The rods of the isolators have threaded upper ends which are inserted through support plates attached to the support beams, and receive an associated knuckle element, corresponding socket and nut thereon. The knuckle element is of a hemispherical configuration, i.e., of a larger radius than that of the rod, functions as a dry bearing surface, and is received in frictional engagement within the corresponding socket. Each knuckle element is capable of limited movement within its corresponding socket. Adjustment of the associated nut adjusts the depending, free length of the rod, and correspondingly adjusts the elevation of the slab, as defined by that rod.

Like the upper end, the lower end of each rod has a knuckle element received in a corresponding socket located along the longitudinal edge of the slab. This lower end of the rod is similarly screw threaded and adjusted via a nut received thereon.

Due to this system, the slab may float relatively to, and thereby be isolated from, the support columns and related support structures which are subject to movement due to seismic disturbances.

The frictional engagement between each corresponding knuckle element and socket, and corresponding resistance to relative rotation therebetween, is intentionally relied upon to provide damping of the displacement, or movement, of the slab relatively to the support columns and related support structures, and correspondingly of the rods' ends relatively thereto. These isolators are preferably the sole damping source of the structure stabilization system, but they can be supplemented with the damping control afforded by an hydraulic damping subsystem, such as used with the base isolation systems of the referenced patents, if desired.

In another embodiment, each knuckle damping pendular isolator is a pair of supports connected in inverse relation by a rod, and extends between a bridge pier and a bridge deck and beam system, each end of the rod again including a knuckle element/socket combination. A first support of the pair has a first, upper plate and a second opposite and lower plate, the first, upper plate including a central opening. The first and second plates are connected by first and second spaced arms. The second plate is fixedly connected to the bridge pier. The second support of the pair also has a first, upper plate and a second opposite lower plate, the second lower plate including a central opening. The first and second plates of the second support are also connected by first and second spaced arms. The first, upper plate of the second support is fixedly connected to a bridge deck and beam system. The rod is received through the central openings formed in the first and second supports, and fixed by nuts.

In a further embodiment, each knuckle damping pendular isolator is two pairs of supports connected by four rods. The plurality of pendular isolators extends between a bridge deck and beam system, and the bridge piers. First and third supports each include a first, upper plate and a second opposite and lower plate. The first, upper plate of the first and third supports each have two openings formed at the ends thereof. The first and second plates are connected by a T-shaped body. The second plate is fixedly connected to the bridge pier. The second and fourth supports also include a first, upper plate and a second opposite lower plate, the second lower plates each including two spaced openings. These first and second plates of the second and fourth supports also are connected by a T-shaped body. The first, upper plates of the second and fourth supports are fixedly connected to the bridge deck and beam system. The four rods are received through the openings formed in the first plates of the first and third supports, and in the second lower plates of the second and fourth supports. Again, at each opposite end of each rod, there is formed a knuckle element received by a socket, and the ends are threaded to receive nuts, as described above.

In each of the above-referenced embodiments, a level monitoring system like that described above, can be used, and the threaded ends of each rod which receive nuts, can be adjusted, as needed, based on the results of this monitoring.

Other objects and advantages of the present invention will be apparent for the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a fragmentary view of an upper portion of a vertical support column and of associated lateral and diagonal beams which support the upper ends of pendulum rods according to this first embodiment.

FIG. 5 is an enlarged fragmentary view of an upper portion of the structure, like that shown in FIG. 4.

FIG. 8A is a schematic diagram of a rod having opposite end knuckle elements engaged in respective, corresponding sockets, useful for explaining knuckle damping force.

FIG. 8B is a schematic diagram, also helpful for explaining the knuckle damping force.

FIG. 9 is a schematic diagram of relative displacement of knuckle elements at opposite ends of a rod.

DESCRIPTION OF THE PREFERRED EMBODIMENTS

Reference will now be made in detail to FIGS. 2–21 illustrating preferred embodiments of the present invention.

While the present invention is disclosed below as being particularly suited for providing seismic protection for a portion of a structure, e.g., a slab, on which expensive equipment such as a high speed printing press is mounted, or a bridge deck, it will be appreciated that the system has broader applicability and, for example, may be employed to protect an entire structure, or building, as disclosed in the above-referenced patents of the inventor. Further, this pendulum-type system may be employed with the base isolation, damping and/or interlock systems described in the '507 and '110 patents, or without these or similar such systems.

Figure 1:
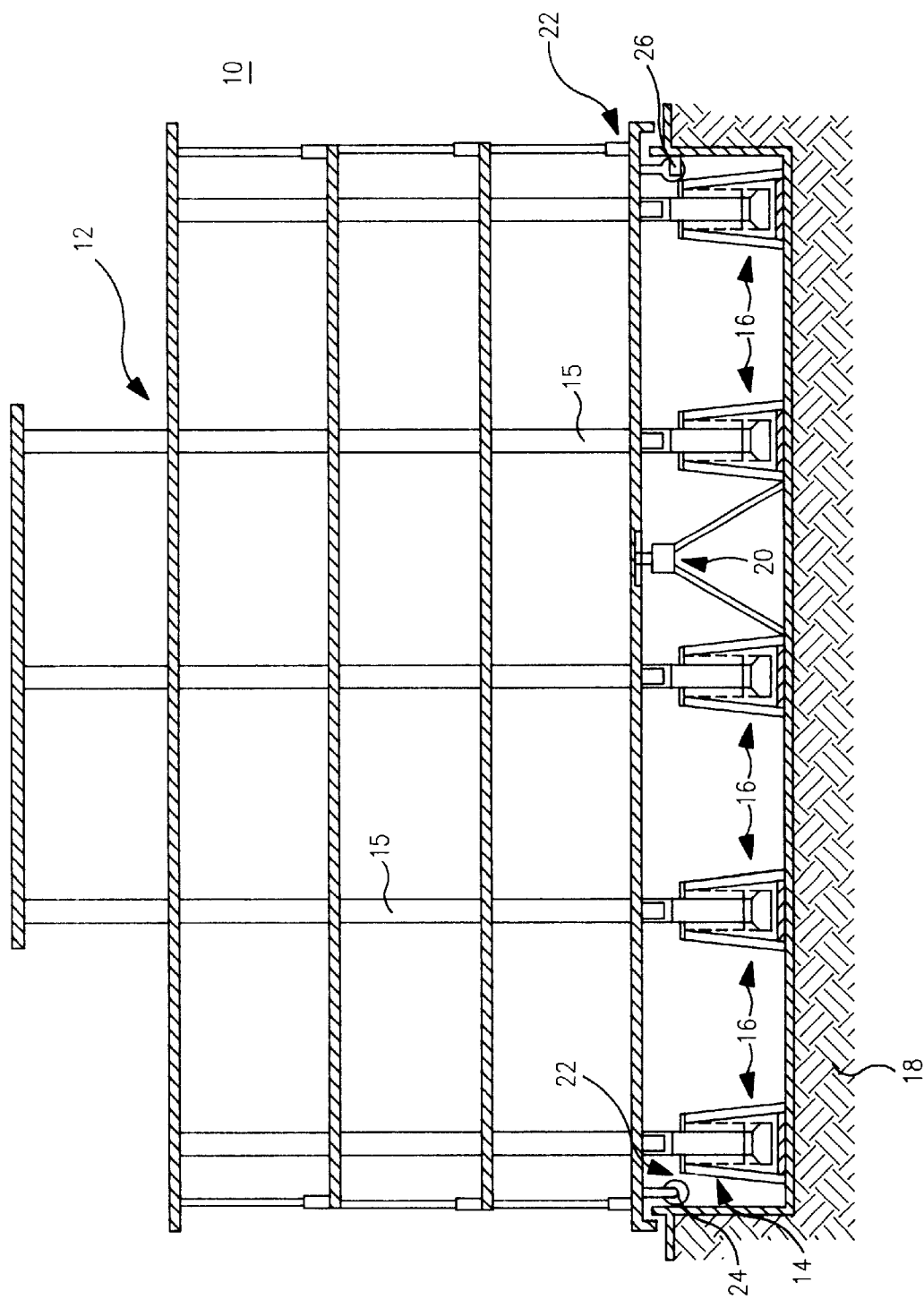
FIG. 1 is a schematic end, elevational and cross-sectional view of a structure and related support foundation incorporating a structure stabilization system in accordance with the afore-noted patents.
Figure 2:
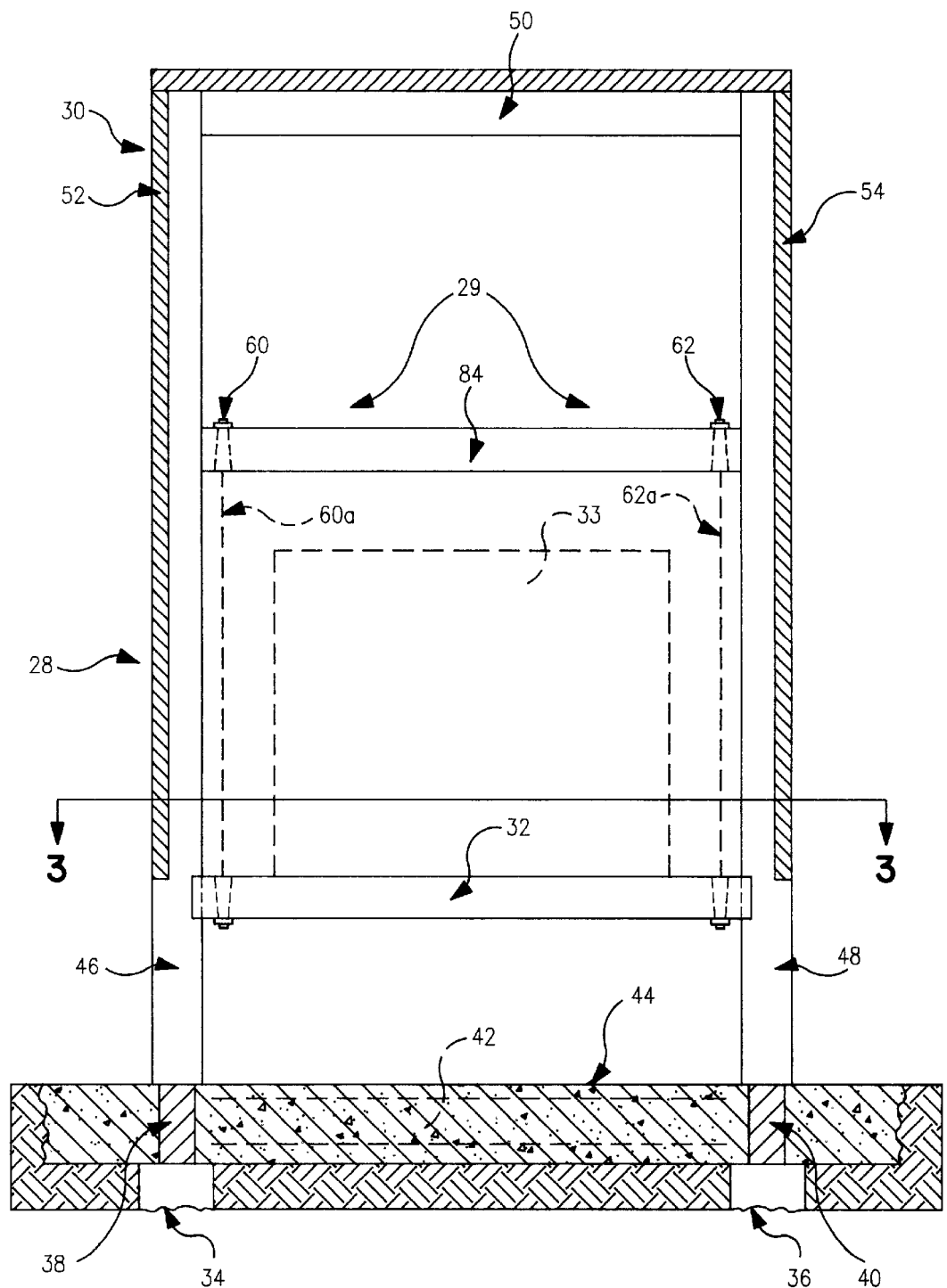
FIG. 2 is a schematic, end elevational and cross-sectional view of a building (support frame) structure according to a first embodiment of the present invention, incorporating a load-bearing slab, and a pendulum-type damping system for the slab.
Figure 3:
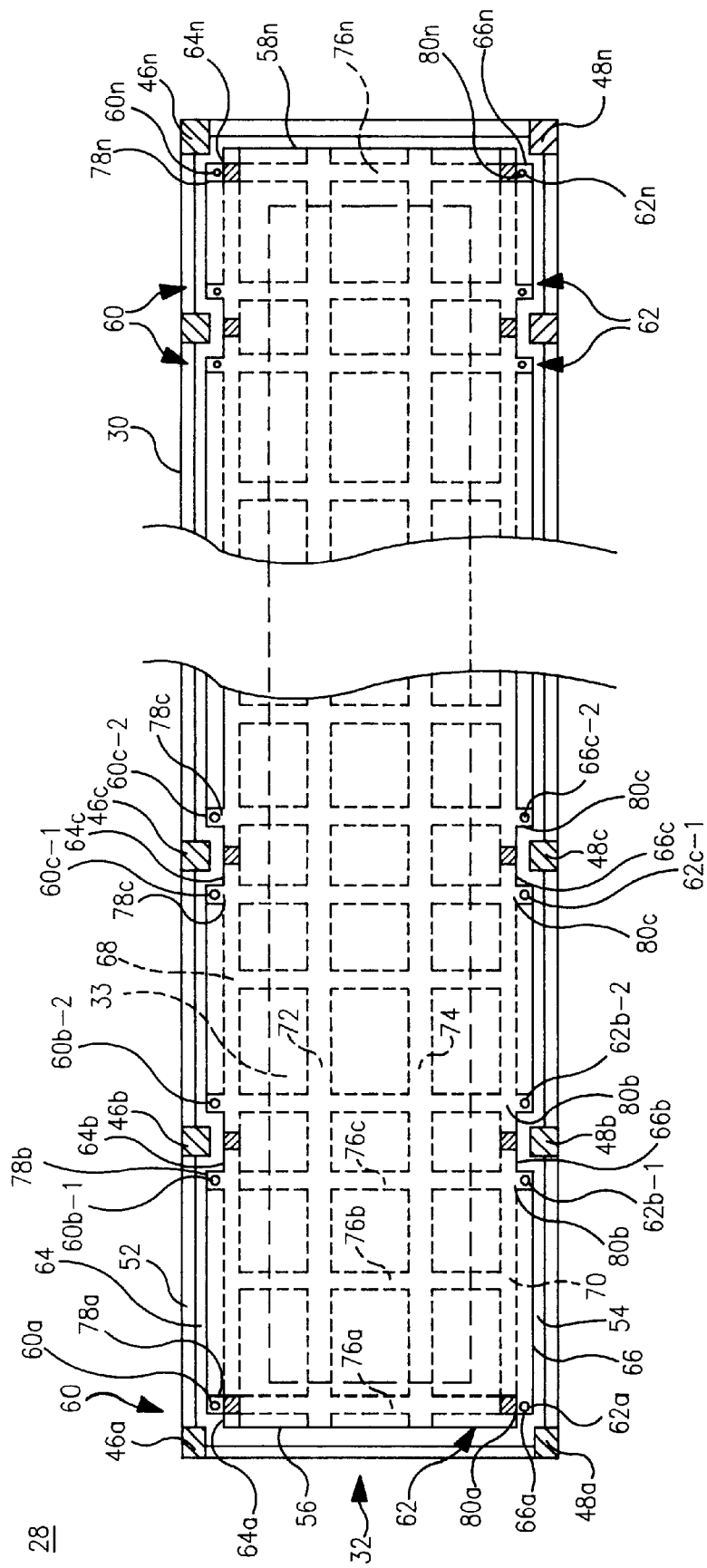
FIG. 3 is a schematic, top plan view, partly in cross-section, of the support frame structure and slab taken along line 3—3 of FIG. 2.

FIGS. 2 and 3 are end elevational and top planar views, respectively, of a building/support structure 30, incorporating therein a slab 32 supported in accordance with the pendulum structure stabilization system 28 of a preferred embodiment of the invention. The slab 32 may serve as a platform or support for equipment 33, such as a commercial high speed printing press, to be protected from seismic disturbances. Because of the generally elongated configuration of such printing presses, the support slab 32 is correspondingly long and narrow and must be supported, not only so as to be isolated from movement under the conditions of the largest earthquake that normally can be expected in the relevant geographic region but also so that the slab not undergo gyration.

As shown in FIG. 2, the non-isolated building 30, or at least a support frame portion thereof, is constructed on conventional pilings 34, 36 which are arranged, in conventional fashion, in laterally spaced parallel rows, extending in a first direction (e.g., longitudinally) of the structure to be supported. Foundation support beams 38, 40 extend longitudinally along the parallel rows of, and are supported by, the pilings 34, 36, respectively. Lateral support beams 42 extend transversely between, and are rigidly interconnected at their opposite ends to, the spaced, parallel longitudinal support beams 38, 40. A concrete floor 44 then is formed on and supported by the longitudinal and lateral support beams 38, 40, and 42 in conventional fashion. Parallel spaced rows of paired vertical support columns 46 and 48, which may be made of steel-reinforced concrete, are supported at lower extremities thereof on the longitudinal support beams 38 and 40, respectively, and are interconnected at the upper extremities thereof by lateral (i.e., transverse) ceiling beams 50, typically steel I-beams.

In FIG. 3, the vertical support columns 46 are represented as plural such columns 46a, 46b, 46c, . . . 46n spaced along a first longitudinal wall 52 of the structure 30. The vertical support columns 48 similarly correspond to plural such columns 48a, 48b, 48c . . . 48n positioned in spaced relationship along a second longitudinal wall 54 of the structure 30, in paired relationship with the columns 46a, 46b, 46c . . . 46n, respectively.

The support slab 32 is held in an elevated position within the structure 30 by the structure stabilization system 28 including a knuckle damping bilinear isolation system 29. In this embodiment, the system 29 includes plural first pendulum supports or pendular isolators 60, and plural second pendulum supports or pendular isolators 62, supported at upper ends thereof by the plural vertical support columns 46 and 48, respectively, via beams 84 extending therebetween, as described below, and at the lower ends thereof to spaced positions along the respective, opposite longitudinal edges of the support slab 32.

The slab 32 is spaced relative to the columns 46, 48, and walls 52, 54 to allow for movement of the slab 32, when necessary, unencumbered by the columns and walls. For the example herein illustrated, the two maximum orthogonal (i.e., X- and Y-components) of the relative horizontal displacement(s) resulting from a maximum seismic disturbance are expected to be close to 10 inches; thus, a 14 inch wide gap is established around the entire periphery of the slab 32 to the surrounding elements (i.e., the columns 46 and 48, as well as the walls 52 and 54, etc. of the structure 30) to allow for such a maximum horizontal displacement of the slab 32.

As best seen in the planar view of FIG. 3, the slab 32 has parallel longitudinal edges 64, 66 which include successive indentions, or recesses, 64a, 64b, 64c . . . 64n and 66a, 66b, 66c . . . 66n. These recesses are disposed about and spaced from the respective vertical support columns 46a, 46b, 46c, . . . and 48a, 48b, 48c, . . . by substantially the same spacing (14 inches) between the interior surfaces of the walls 52, 54 and the longitudinal edges 64, 66 of slab 32.

The slab 32 is made of reinforced concrete, or a similar material, and includes monolithically integrated reinforcement beams. The integral support beams include longitudinal, outer support beams 68 and 70, longitudinal inner support beams 72 and 74, and plural transverse support beams 76a, 76b, 76c, . . . 76n which extend between and integrally interconnect the outer and inner longitudinal support beams 68, 70, 72, 74.

In addition to being designed to withstand the vertical loading of the equipment 33 positioned thereon, the slab 32 is also designed to have considerable stiffness for minimizing differential vertical displacements. The slab 32 also is designed to have a mass much larger than that of the equipment 33 mounted thereon so that the slab 32, including the equipment 33, may be considered as a unitary rigid body for purposes of dynamic analysis. The large mass also assists in minimizing vibration, which could result from regular operation of the equipment 33 or its start-up or sudden stopping, to an imperceptible level.

The slab 32, moreover, is reinforced at comer portions 78a, 78b, 78c . . . 78n along the first longitudinal edge 64, and at corner portions 80a, 80b, 80c . . . 80n along the second longitudinal edge 66 adjacent the respective recesses, e.g., 64a, 66a, for receiving the distal (i.e., lower) ends of rods which are a part of the associated pendulum supports or pendular isolators 60, 62, as later described.

As illustrated schematically in FIG. 2, and as also shown in FIGS. 4 and 5, transversal steel beams 84 extend between, and are connected at their respective opposite ends to, the corresponding pairs of vertical support columns 46 and 48. The pendulum supports 60, 62 are secured to the junctions, or interconnections, of the respective, opposite ends of each transversal beam 84 and the associated vertical support columns 46 and 48 (only one such beam 84 and vertical support column 46b, 48b being shown in each of FIGS. 4 and 5), and more particularly to respective diagonal support beams 86 and 88, which extend angularly and symmetrically from the beam 84 to a longitudinal support beam 90 (FIG. 4). For example, adjacent pendulum rods, e.g., 60b-1 and 60b-2 shown in FIG. 4, extend from the respective diagonal support beams 86 and 88 downwardly, in symmetrically spaced and parallel relationship relatively to the associated vertical support column 46b.

As illustrated in FIG. 3, the first pendulum supports 60 and the second pendulum supports 62 contribute to provide successive pairs of spaced rods and, more particularly a first pair 60a, 62a, at a first transverse end 56 of the slab 32, successive pairs 60b-1, 62b-1, and 60b-2, 62b-2, etc., and a final pair 60n and 62n at an opposite transverse end 58 of the slab 32. The pendulum rods 60a, 60b-1, 60b-2, . . . , 62a, 62b-1, 62b-2, . . . , etc. are identical and each may be a 4 inch diameter steel rod. The lower end of each rod 60a, 62a, 60b-1, etc., is received in the corresponding, reinforced corner, 78a, 80a, etc. in the slab 32.

Figure 6:
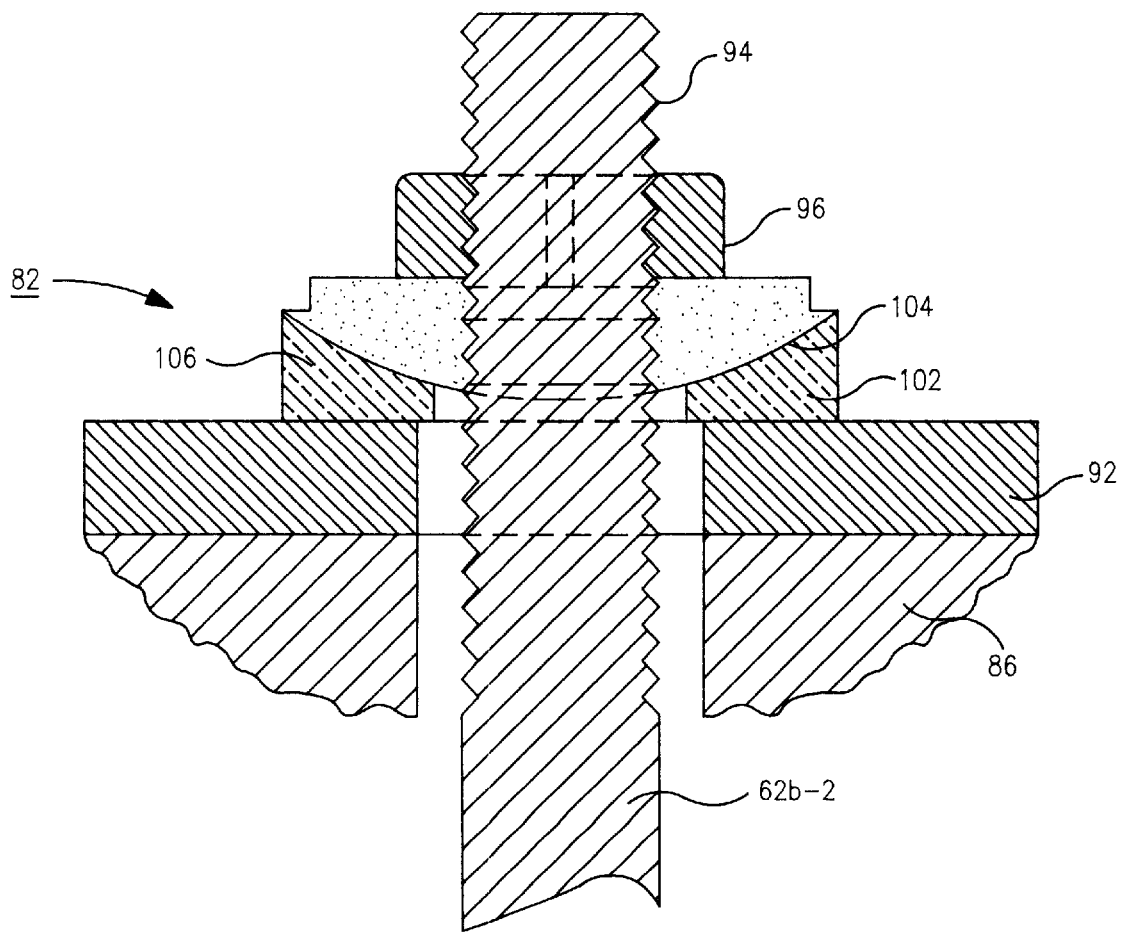
FIG. 6 is a side, cross-sectional view of a knuckle element/socket combination at an upper end of a pendulum rod, according to the present invention.

As shown in FIGS. 5 and 6, rod 62b-2 is associated with an upper aperture seating plate 92 which is received on the diagonal support beam 86, a threaded upper end 94 of the rod 62b-2 being inserted therethrough and held in position by a nut 96. Similarly, adjacent rod 62b-1 is associated with an upper aperture seating plate 93 which is received on the diagonal support beam 88, a threaded upper end 95 of the rod 62b-1 being inserted therethrough and held in position by a nut 99.

As shown in FIG. 6, which illustrates in greater detail the upper end 94 of the rod 62b-2 of FIG. 5, this end includes a knuckle joint 82 including an enlarged hemispherically shaped knuckle element 100 having a curved bearing surface 104 and a radius greater than that of the rod 62b-2. The knuckle element 100 is received on the rod and in a socket 102, also received on the rod and having a corresponding mating surface 106, thereby pivotally interconnecting the rod 62b-2 to the beam 86. The mating surfaces 104, 106 preferably are designed to function as a frictional damper, as discussed below, for producing the entire damping of the linear movement of the slab 32 relatively to the supporting pendulum rods 60a, 60b-1, 62a, 62b-1, 62b- 2, . . . , etc. (and, correspondingly, to the support frame and the earth) in the event of a seismic disturbance.

The knuckle joint 82 is adjustable. That is, since the threaded rods go through corresponding holes in the knuckle elements and sockets, with a slidable, loose fit, when the nuts (hydraulic or mechanical) are tightened, the rod moves through the knuckle elements and sockets. More particularly, the mechanical nuts, 96, 99, 118, shown in FIGS. 5–7 may be driven in rotation by the appropriate extent, e.g. thereby to raise or lower an area of the slab 32. As in the above-cited pending application, this adjustment facilitates initial assembly and also later pendulum length adjustment.

Figure 7:
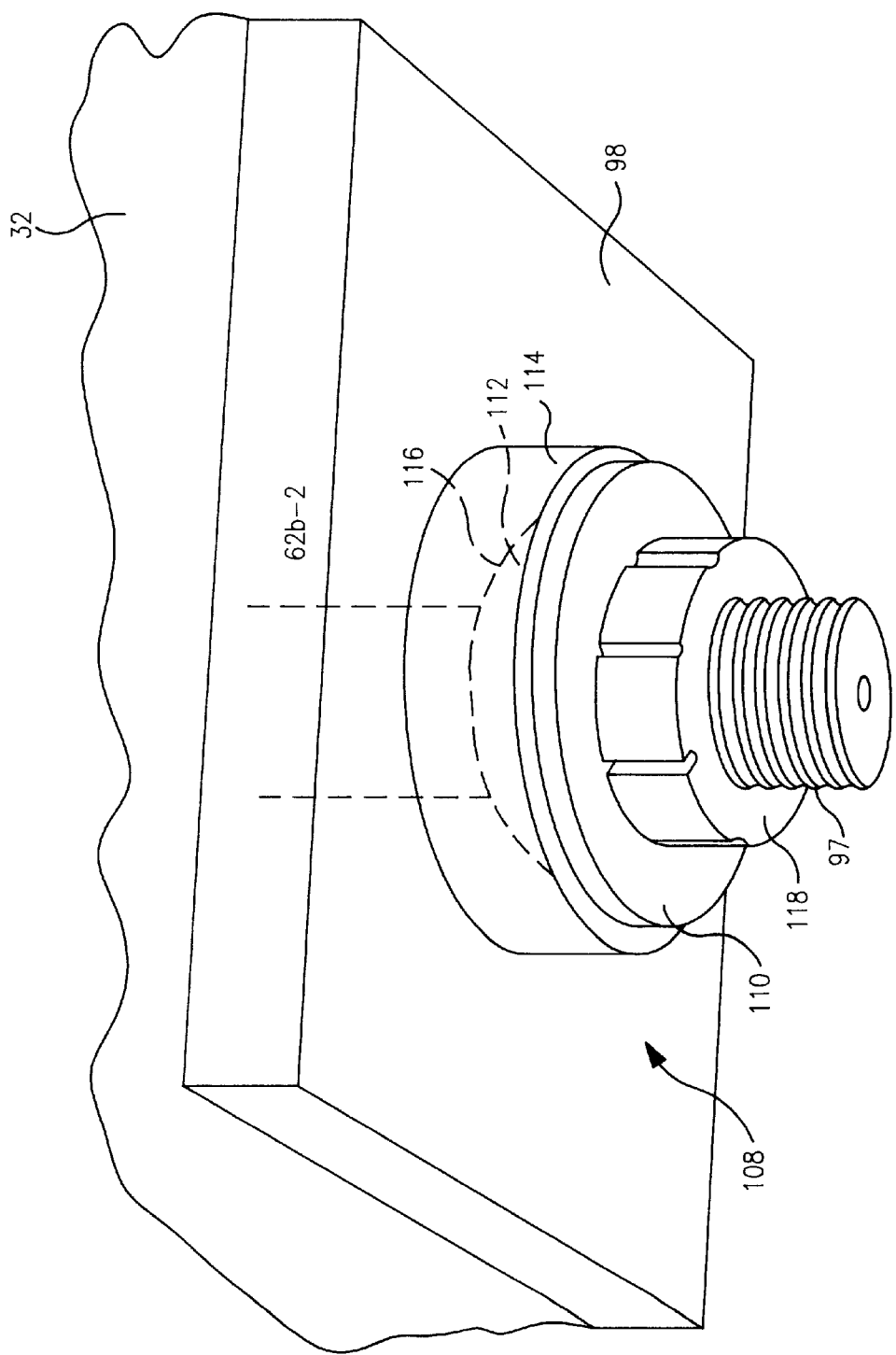
FIG. 7 is a perspective view of the knuckle element/socket combination at a lower end of a pendulum rod, at a corresponding edge portion of the slab.

FIG. 7 is a perspective view of a knuckle joint 108 at a lower end 97 of the rod 62b-2 of FIG. 5. A lower end knuckle element 110 is the same structurally as the knuckle element 100 at the upper end 94 shown in FIG. 6 described above, merely reversed. That is, the knuckle element 110 is of an enlarged, hemispherical shape having a curved bearing surface 112 and a radius grater than that of the rod 62b-2. Each lower knuckle element 110 is received in a socket 114 having a corresponding mating surface 116, thereby pivotally interconnecting the rod 62b-2 to the slab 32. The mating surfaces 112, 116 contribute to the overall function of the knuckle joints as a frictional damper for producing the entire damping of the linear movement of the slab 32 relatively to the supporting pendulum rods (and, correspondingly, to the support frame and the earth) in the event of a seismic disturbance. Again, each lower end of the rod is threaded, receives a central opening in the knuckle element 110 and socket 114, and receives a threaded nut 118, like the arrangement shown in FIG. 6.

When this knuckle-damping pendular isolation system is used, a knuckle joint is placed on each end of the rod that acts as a pendulum. This fact is independent of the shape or configuration of the structural members linking the pendulum with the ground on one side, and with the structure to be protected from the seismic disturbance forces on the other.

The knuckle elements 100 (110)/sockets 102 (114) are generally known as spherical plain thrust bearings, which are available, e.g., from the SKF Company of King of Prussia, Penn. Such bearings have sliding contact, steel-on-steel, surfaces which are generally inclined at an angle to the bearing axis, and are generally considered maintenance-free. They are primarily intended to carry axial loads in one direction but can accommodate combined loads.

While such bearings are known, it is not believed that they have been used to provide frictional damping of seismic forces according to the present invention. For example, conventional such bearings can include a Teflon-coated mating surface, or can be lubricated, each of which significantly reduces friction, an effect opposite to the desired damping effect sought herein. Instead, the present invention relies upon the substantial friction which can exist at the mating surfaces.

The pendulum supports 60, 62 are designed to have the appropriate pendulum arm length considering the characteristics of the relevant geographic area. As taught in the prior patents discussed above, the length of the pendulum should be proportionate to at least a natural period 2.5 times larger than the expected dominant period of the ground. By this provision and with the addition of proper damping as described, in most cases the horizontal acceleration produced by a seismic disturbance can be reduced by approximately 90%.

FIGS. 8A–10 help illustrate the forces relevant to a knuckle damping pendular isolation bilinear system.

FIGS. 8A and 8B are schematic diagrams of the above-mentioned system, illustrating the friction knuckle joint damping force at each end of the rod, which force can be defined by the following formulae:

$$DF(L/2) = r(\mu W) \quad (1)$$

$$DF = 2\mu r K \quad (2)$$

where
L=Effective length of the pendulum
W=Vertical Load
r=Knuckle element radius
$\mu$=Friction coefficient
DF=Knuckle Joint Damping Force
K=Spring factor (W/L)

These formulae, and others used herein, generally do not include any unit-system dependent factors, therefore they are valid for any unit system. Units of the resulting figures will be in accordance with the system employed.

Figure 10:
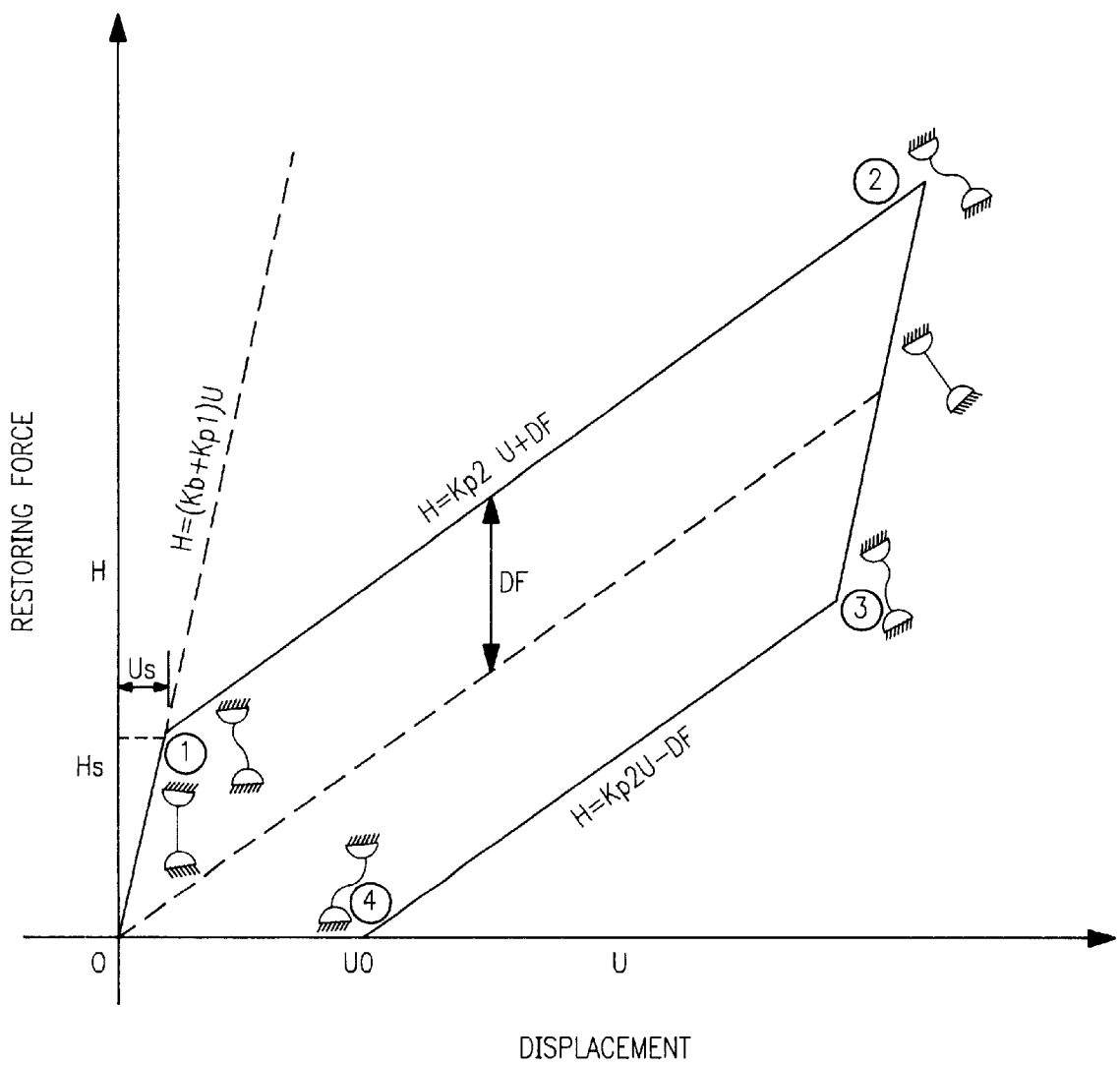
FIG. 10 is a chart illustrating the restorative forces applicable after relative displacement of the knuckle elements.

FIG. 10 shows, in the abscissa axis, the horizontal relative displacement between the two knuckle elements placed at the ends of the rods and, in the ordinate axis, the corresponding horizontal restoring force. Also shown are the equations governing the relationship between these two variables. The magnitude of the displacement and of the restoring force present at the beginning of gyration, as well as that of the maximum residual displacement between the knuckle elements, can be seen in the same figure.

The nomenclature employed in FIG. 10 and in the formulae that follow is:
l=L-2r, Effective length of the rod to flexion, and of the pendulum before or when there is no gyration in the knuckle elements.
Kb=12El/l, Spring factor of the rod
Kp1=W/l, Spring factor of the rod before gyration in the knuckle elements or when there is no gyration in the knuckle elements
Kp2=W/L, Spring factor of the rod during gyration in the knuckle elements H=Restoring Horizontal Force U=Relative horizontal displacement of the knuckle elements Us=Relative displacement of the knuckle elements at the start of gyration Hs=Restoring Force at the start of gyration in the knuckle elements Uo=Maximum residual displacement of the knuckle elements The values of Us, Hs and Uo are the following:

$$Us=DF/(Kb+Kp1-Kp2) \tag{3}$$

$$Hs=Us(Kp1-Kb) \tag{4}$$

and:

$$Uo=2\mu r \tag{5}$$

FIG. 9 illustrates a rod that joins two knuckle elements, shown deformed due to the horizontal shear force, which is equivalent to the restoring force when there is no relative gyration in the knuckle elements. This is represented in the force diagram of FIG. 10 by the segment 0–1.

During an earthquake all the elements of an isolation system are in movement. Thus, what is important is the relative displacement between the elements connected to the isolated structure. The gyration of the knuckle element is also fundamental according to this damping system invention and not mere movement.

Studies have been performed aimed at the effectiveness of this pendular isolation system using simplified pendulum isolators on which damping action is supplied exclusively by knuckle joints on both ends of each pendular tension member. Such devices could be advantageously employed for seismic-isolation of buildings, as well as in bridges and overpasses, particularly in areas where earthquake dominant periods of less than one-second could be expected. There are many possible arrangements of these pendular isolators, as described below.

For these studies, a specific case was tested, which was regarded as typical for areas in which the dominant period is less than a second as is true for most of the State of California. The effects of the widely known 1940 El Centro earthquake were studied on a seismically-isolated mass, using comparative analyses of two systems, one with knuckle-friction damping as described herein, and the other with conventional viscous (hydraulic) damping, both cases having the same pendular length of 150 cm. Friction coefficients at the knuckle joints can vary between 0.05 and 0.15, according to the materials employed in their construction; therefore, values of $\mu r$ between 0.5 and 5.0 cm were studied. In the viscous damping case, values between 0.05 and 0.20 of the critical damping were assumed.

It was shown via these studies that the pendular system is indeed very efficient, whether used with viscous (hydraulic) damping or relying upon knuckle-friction damping only. The results are included in FIGS. 11A–F, wherein three main seismic responses for each of the two damping systems are compared. Similarly, one can determine, in a structure fitted with any type of seismic base isolators, the peak ground accelerations (PGA), the peak relative velocities (PRV), and the peak relative displacements (PRD), whenever the structure is subjected to an earthquake whose accelerogram is known.

In order to obtain these results, it was necessary to consider, in addition to the accelerogram, the characteristics of the isolation system, which are determined by the formulae (1)–(5) above. These characteristics are the basis for the energy dissipation of the system, which gives the results shown in FIGS. 11A–11C (11D–11F).

More particularly, the charts of FIG. 11 represent the response of the 150 cm effective-length (T=2.465) pendulum member to a simulated El Centro earthquake (peak ground acceleration 330 cm/sec$^2$). FIGS. 11A–11C illustrate the response of the pendulum member in a spherical knuckle friction damping system as described herein. In comparison, FIGS. 11D–F show the pendulum member in a linear viscous (hydraulic) damping system. In these figures, $\mu$=friction factor, r=radius of the spherical knuckle element and $\xi$ is the fraction of critical damping. With knuckle friction damping, a larger reduction of the absolute acceleration of the isolated mass, which is the most important seismic response, is obtained. This reduction is approximately 76% (from 330 cm/sec$^2$ in the ground to 80 cm/sec$^2$), for a value of $\mu r$ of 2.5 cm (which, for instance, could correspond to a friction coefficient of 0.125 and a radius of the knuckle element of 20 cm).

The degree of damping of the system can be selected by taking advantage of the varying friction coefficients of the assorted known combinations of materials that can be used in the construction of maintenance-free knuckle joints, as well as of their different radiuses. In this regard, known spherical axial thrust bearings are the preferred device for the present invention, since no angular forces at all are present in same. The size is determined in accordance with the manufacturer's recommendations for the axial load to be supported. The load to be expected is determined by structural analysis. No maintenance is required or expected, as specified by the axial knuckle-bearing manufacturers. As noted above, the damping force would be expressed by the formula DF=2$\mu r$W/L.

One can obtain an estimate of the seismic responses in applications that include special parameters, among others, an application similar to that of the above-described slab system used with a printing press. Such calculation estimates are based on the following dynamic equation for an instant "t":

$$m\ddot{U}+a\dot{U}^b+KU+F=-m\ddot{U}gh \tag{6}$$

This formula refers to the equilibrium of dynamic forces in a one-degree-of-freedom system. These forces: the inertia force of the isolated mass (m$\ddot{U}$), the hydraulic or viscous damping force (a$\dot{U}^b$), the restoring force due to the isolation system's spring factor (KU), the friction force (F), and the force produced in the isolated mass by the horizontal acceleration of the ground (M$\ddot{U}$gh), vary during the occurrence of the movement. This dynamic equation is satisfied for the different values of these variables at any instant "t" of the event.

In the above formula, the following factors are used:

"a" and "b"—Coefficient and exponent of the relative velocity, when viscous damping is not linear, resulting from experimental tests. (That is, when hydraulic dampers are used, damping force-velocity tests need to be performed, as described in U.S. Ser. No. 98/629,601, involving the printing press slab. From such tests, the coefficient "a" of the relative velocity and its exponent "b" are determined.)

F—Friction damping force applied directly to the mass (could be provoked by friction on viscous dampers and/or by any friction damping element).

K—The spring factor. In the special case of the pendular isolation, "K" has the following values:

1)—When cables are used:

$$K=K_o=W/L \tag{7}$$

2)—When flexible rods with two fixed ends are employed:

$$K=K_b+K_o \tag{8}$$

3)—When rods with knuckle joints on each of the opposite rod ends are used, there are two values for K;

Before gyration of the knuckle elements (or when there is no gyration of the knuckle elements):

$$K=K_b+K_{p1} \tag{9}$$

During gyration of the knuckle elements:

$$K=K_{p2} \tag{10}$$

The spring factor, $K_b$, corresponds to the force-displacement ratio between the two ends of a rod, before any gyration occurs. Its value 12 El/l is indicated above. The value of the spring factor in a pendulum, for small displacements in relation to its length, is equal to the weight it supports (W) divided by the pendulum's length (L).

As the pendulum length has two different values, before gyration (l) and after gyration (L), there is designated above the respective spring factors "$K_{p1}$" and "$K_{p2}$". Ko is the pendulum spring factor, when the pendulum length does not vary, as in the case of a wire-rope supporting a mass.

Simpler cases can be solved using the simplified equations shown below. For example, when the only damping forces are those caused by friction at the knuckle joints:

$$m\ddot{U}+KU=-m\ddot{U}gh \tag{11}$$

This equation was applied to the case of a bilinear isolation system with similar components of those shown in FIGS. 8A to 9, and the system was subjected to the action of the north-south component of the El Centro earthquake. This test sought to obtain the absolute acceleration, the relative velocity and the relative displacement of the isolated mass for values of $\mu r$ varying, at 0.5 cm. increments, from 0.5 cm. to 5 cm. In this example, the values of m, $K_b$, $K_{p1}$, $K_{p2}$ and Hs, were calculated from the following data:

W=60,000 kg.
L=150 cm.
l=110 cm.
D=7.5 cm. (rod diameter)

Figure 11A:
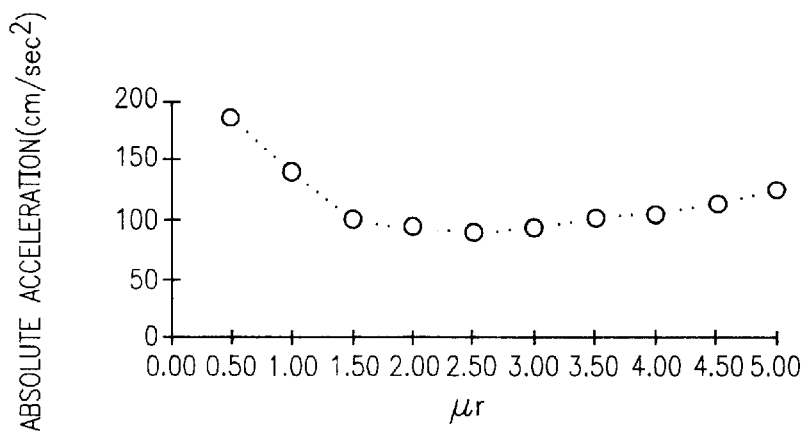
FIGS. 11A–C are charts illustrating the peak absolute acceleration, relative velocity and relative displacement for the isolation system, respectively, when knuckle damping is used.
Figure 11B:
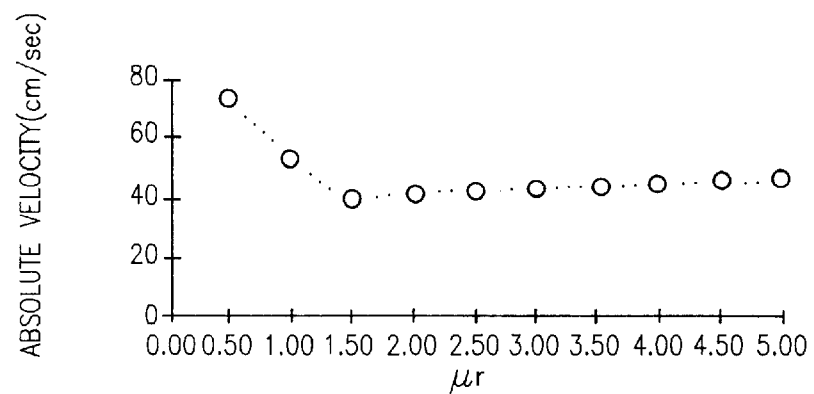
Figure 11C:
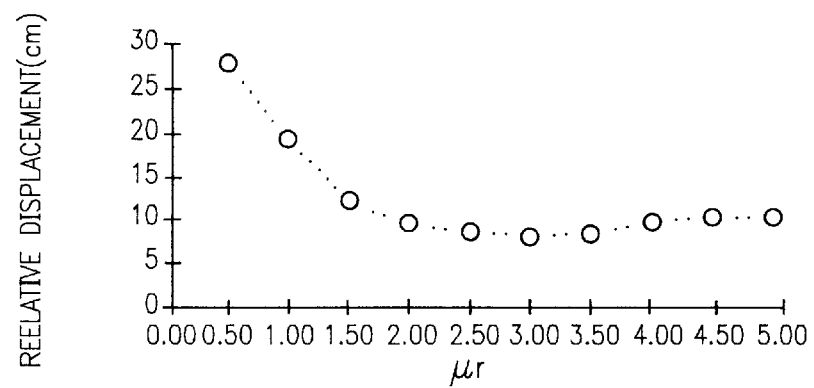
Figure 11D:
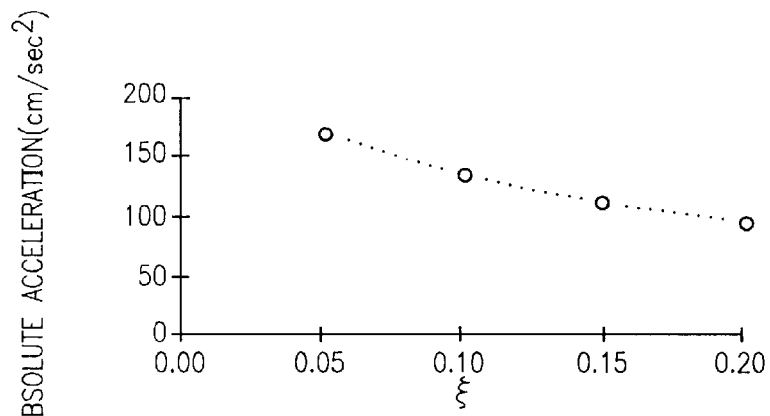
FIGS. 11D–F are charts illustrating the same peak responses as shown in FIGS. 11A–11C, when viscous (hydraulic) damping is used.
Figure 11E:
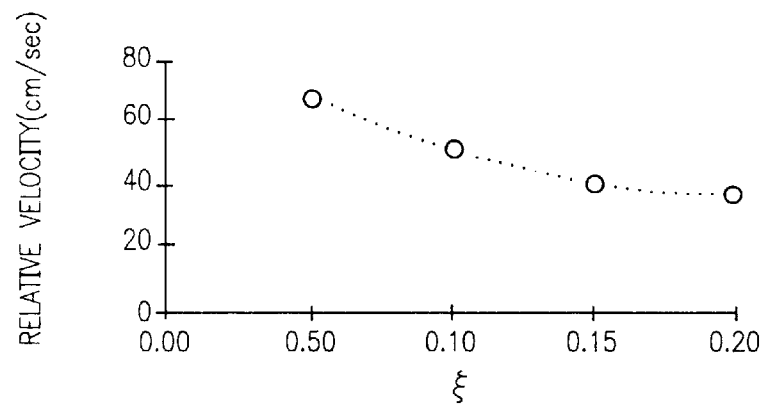
Figure 11F:
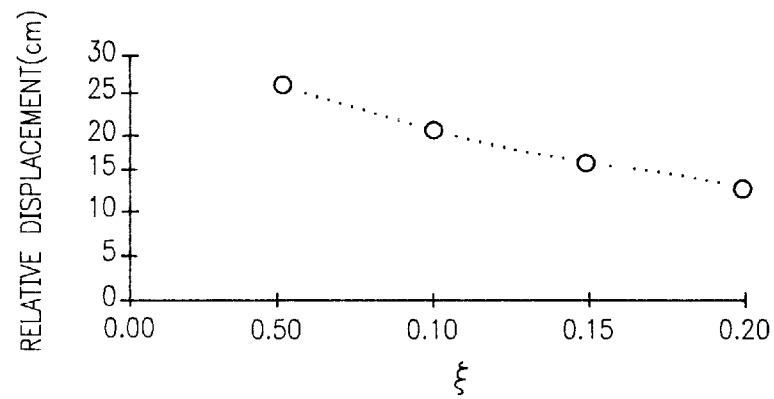

The results, when using the knuckle damping system only, are shown in FIGS. 11A–11C.

For the usual case where only linear viscous damping is considered, the corresponding equations are:

$$m\ddot{U}+a\dot{U}^b+KU+F=-m\ddot{U}gh \tag{12}$$

This formula was applied to the same previously-mentioned pendular isolator system for comparing the performance of both damping systems. The results are shown in FIGS. 11A to 11F.

For the specific case when friction damping force occurs, or when it is applied directly on the mass:

$$m\ddot{U}+KU+F=-m\ddot{U}gh \tag{13}$$

When utilizing knuckle friction damping forces, hydraulic dampers can be eliminated. As noted above, while the hydraulic dampers were helpful in damping gyrational forces, there is evidence to suggest that the use of hydraulic dampers contributes to the institution of gyrational forces. That is, whenever such tendency arises it is because of unbalanced forces originated by the damping system. Thus, if the hydraulic dampers are eliminated, the gyrational forces and the need to oppose same may also be eliminated. This concept was studied as described below. In brief, by using knuckle friction damping only, damping forces will always be proportional to vertical loads, and the center of gravity of the structure will be the same as that of the acting forces. So, no gyration (torsion moment) is ever generated, and there is no need to compensate for same.

Figure 12:
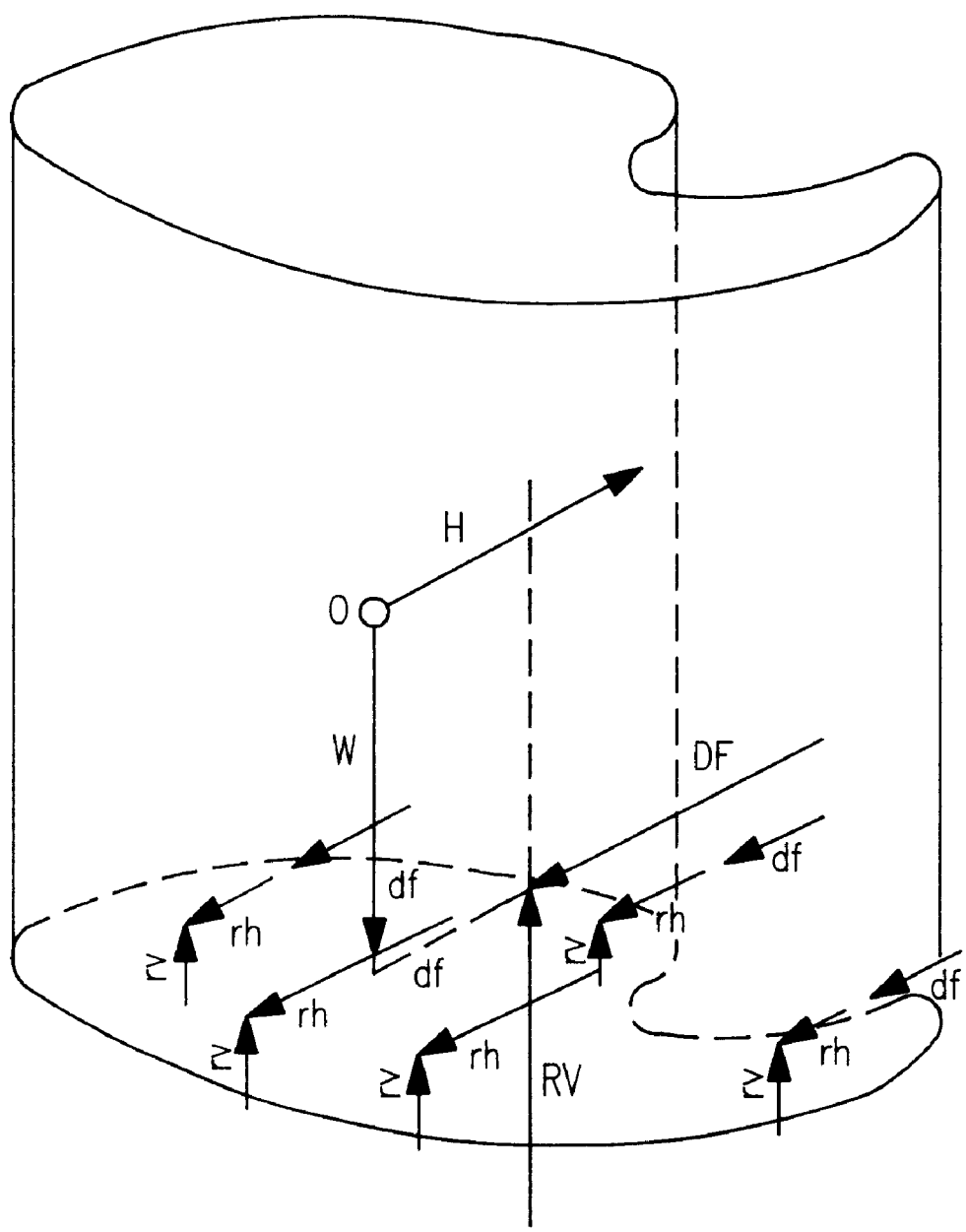
FIG. 12 is a diagram illustrating the absence of torsional moment for an irregular-shaped building with a knuckle damping system according to the present invention.

More particularly, FIG. 12 illustrates a mass representing an irregular-shaped building with total weight W, assumed to be concentrated at a center of gravity 0, and any number of supports where reactions rv occur. It has been proved that the spring constant of suspended supports depends on vertical load and the length of pendular members. For small displacements, $$k=rv/L \tag{14}$$

where:
rv=vertical reaction of a given support
L=pendular member's length
DF=damping force of the whole system
df=damping force of a given support
$\mu$=friction coefficient of all knuckle joints
r=knuckle element radius
K=W/L=spring constant of the whole mass
k=rv/L=spring constant of the whole mass
DF=$2\mu rk=\mu rW/L$
df=$2\mu rk=2\mu r(rv/L)$ Whenever a translational movement in a certain direction takes place, displacements in all supports are the same, restoring forces will appear in each support of a magnitude directly proportional to the vertical reaction rv in the same support-provided all pendular members are of the same length. At the same time, damping forces also proportional to vertical load rv will be generated. Therefore, being that all horizontal forces are proportional to the vertical reactions, the resultant thereof will necessarily fall in the same vertical plane as the resultant of the vertical forces. It can then be inferred that gyration (dynamic torsion moment) is nonexistent.

As in the U.S. Pat. No. 5,797,227 described above, the present invention also may provide for monitoring the level of the suspended slab 32 at each of the positions along the edges thereof at which the lower distal ends of the rods are connected, in order to detect differential vertical displacements that could be caused by differential settlement of the foundation on which the support columns are mounted. Any detected height differentials are then corrected by rotating the nuts and thereby adjusting the relative heights of the associated pendulum rods, in the described manner.

Figure 13:
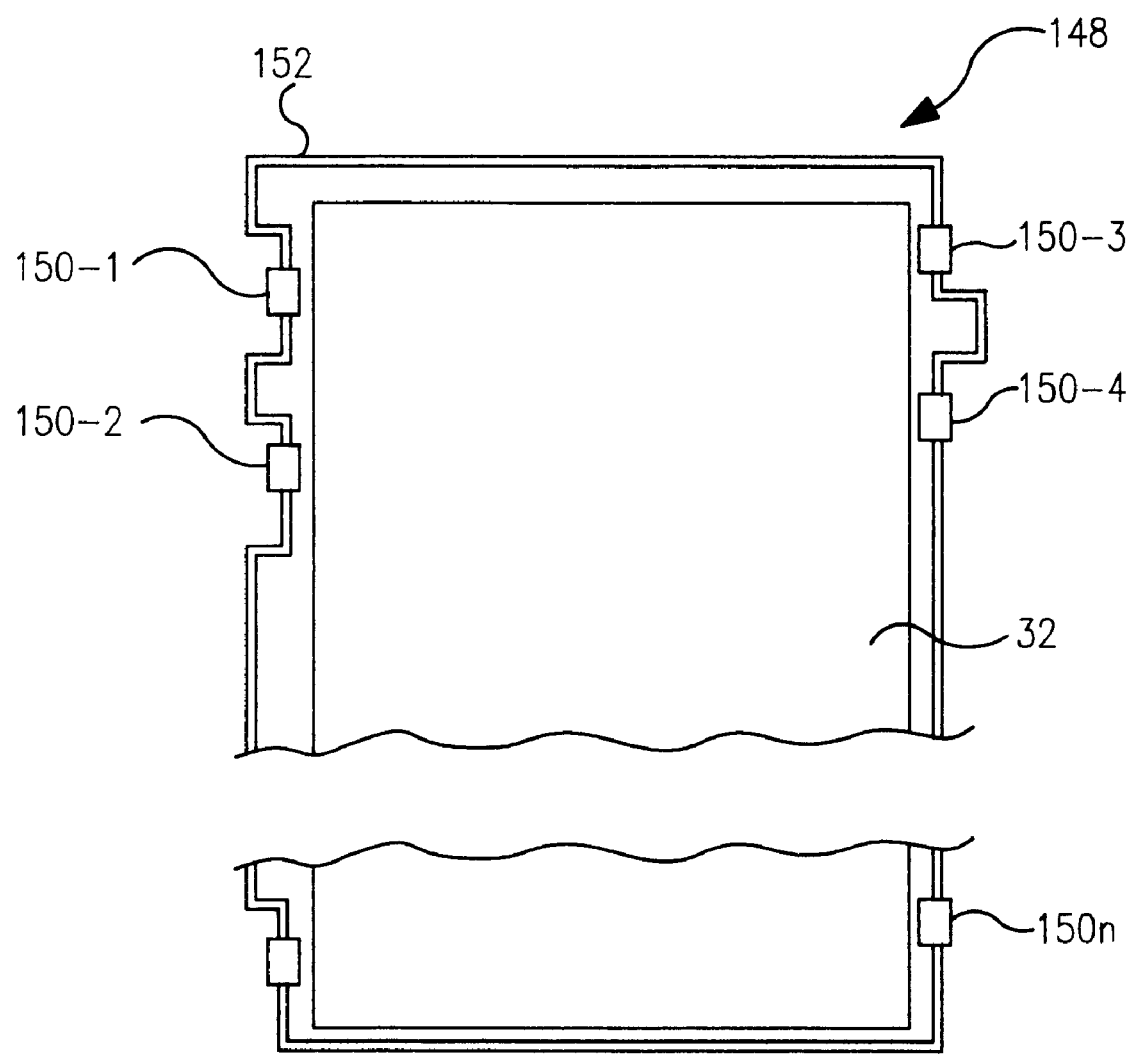
FIG. 13 is a schematic view of a level monitoring system used with the present invention.

In this regard, FIG. 13 is a schematic of a level monitoring system 148 which monitors differential height variations at each pendulum support connection position on the slab 32. Particularly, sensors 150-1, 150-2 . . . 150-n are mounted in respective, appropriate sensing locations, adjacent corresponding interconnection positions of the slab 32 to the vertical support columns 46, 48 of the system 28. A conduit 152 extends about the perimeter of the support slab 32 interconnecting, effectively in a series, all of the sensor stations 150-1, 150-2, . . . 150-n.

Described below are second and third embodiments of the knuckle damping pendular isolation system 29. These embodiments include a plurality of pendular isolators, each using one or more rods. The isolators are applied to isolating a bridge deck from its piers, thereby damping seismic disturbances experienced by the piers, and protecting the deck from related damage.

Figure 14:
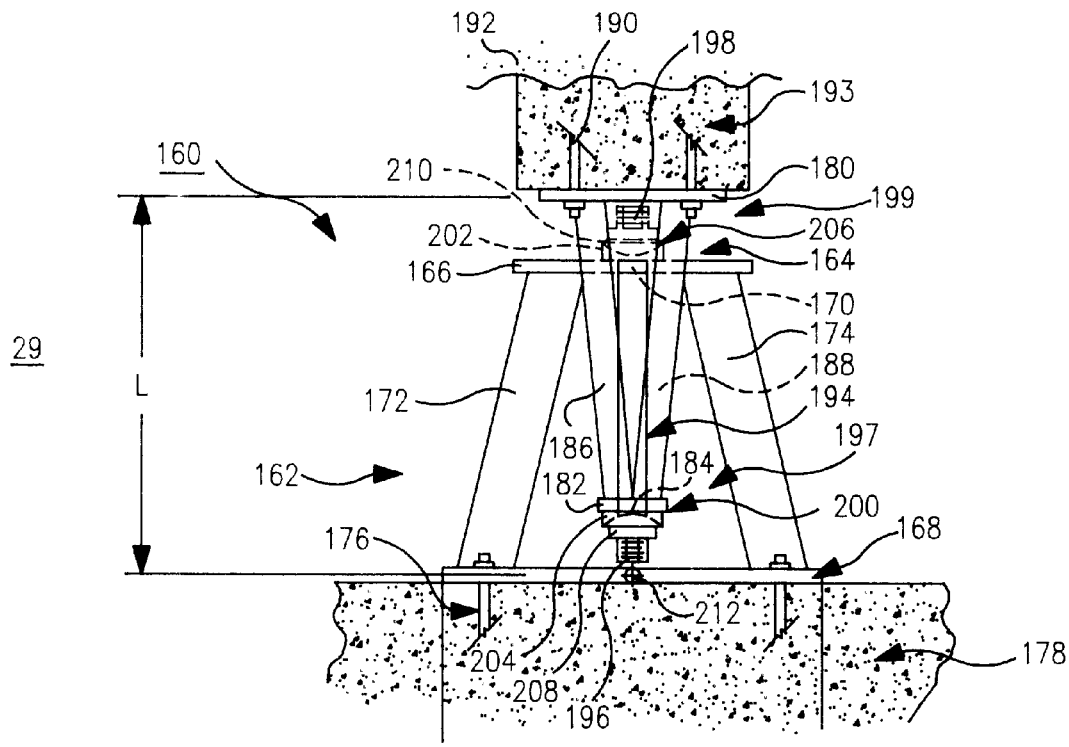
FIG. 14 is a side view of a second embodiment according to the present invention, including a single rod knuckle damping bridge seismic isolator.
Figure 15:
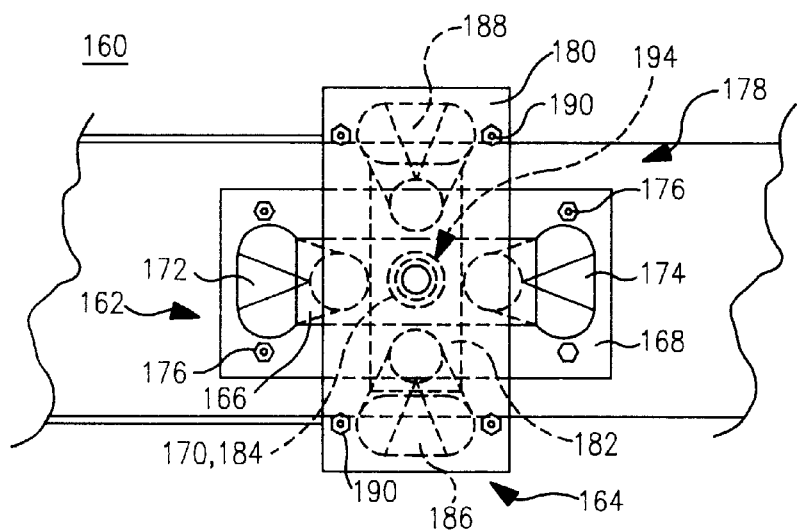
FIG. 15 is a top view of the single rod knuckle damping bridge seismic isolator shown in FIG. 14.
Figure 16:
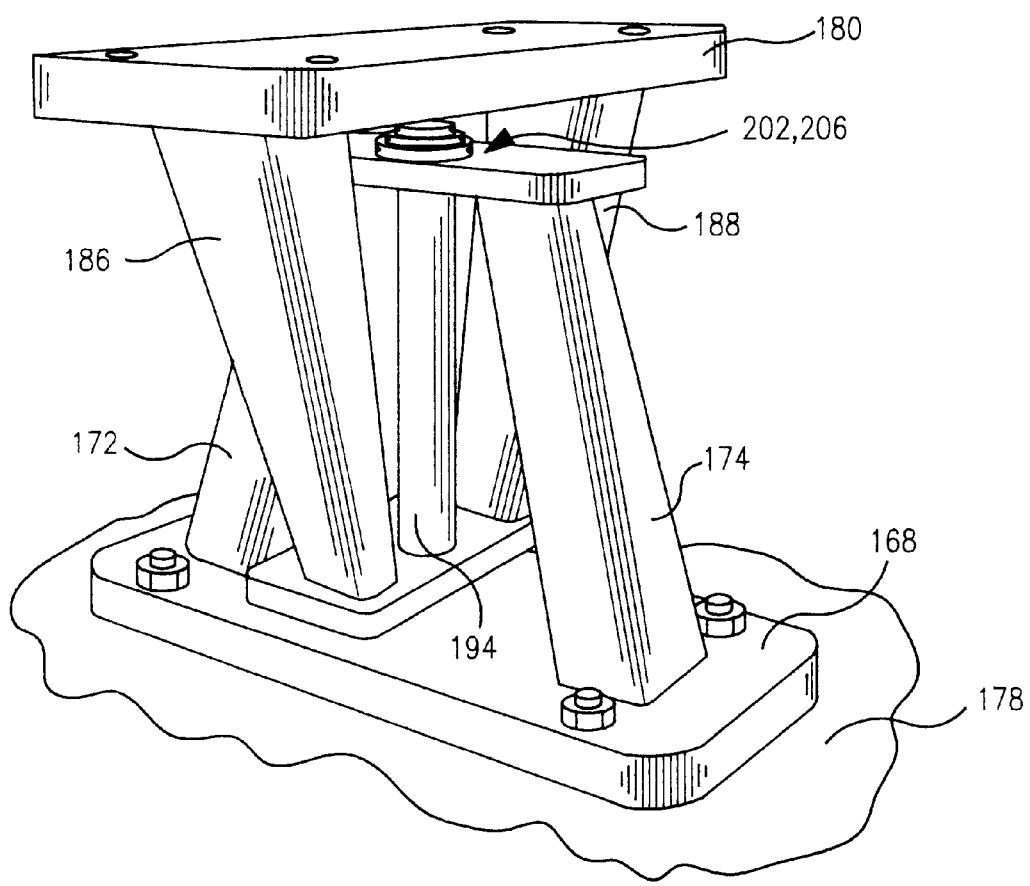
FIG. 16 is a perspective view of the isolator shown in FIGS. 14 and 15.

FIG. 14 is a side view of a second embodiment according to the present invention, including a single rod knuckle damping seismic pendulum isolator 160. This isolator 160 includes first and second supports 162 and 164 which are generally identical but oriented inversely to each other. FIG. 15 is a top view, and FIG. 16 is a perspective view thereof.

The first support 162 includes a first, upper plate 166 and a second opposite and lower plate 168. Each plate 166, 168 is rectangular, with the first plate 166 being smaller than the second plate 168. Also, the first, upper plate 166 includes a central opening 170 for receiving a rod 194 as described below. The first and second plates 166, 168 are connected by first and second spaced arms 172 and 174 which diverge outwardly from the first plate 166 to the second plate 168, and which can take the form of pipes.

The second, lower plate 168 is fixedly connected via a plurality of anchors 176 to a member attached to the ground, and in this preferred embodiment, a bridge pier 178.

The second support 164 also includes a first, upper rectangular plate 180 and a second opposite, lower and smaller rectangular plate 182. The second, lower plate 182 includes a central opening 184 for receiving the same rod 194, as described below. The first and second plates 180, 182 of this second support 164 are similarly connected by first and second spaced arms or pipes 186 and 188 which diverge outwardly from the second plate 182 up to the first plate 180. The first, upper plate 180 of the second support 164 is fixedly connected via a plurality of anchors 190 to a bridge beam or deck 192 including a beam system, one beam 193 being shown.

Extending between the first and second supports 162, 164 is a pendular tension member or rod 194 which is received through the central openings 170, 184 formed in the first plate 166 of the first support 162, and in the second plate 182 of the second support 164. Near each opposite end 196 and 198 of the rod 194, there is formed a maintenance-free spherical thrust bearing or knuckle joint 197, 199, each including a knuckle element 200, 202 received in a socket 204, 206, respectively. In addition, each end 196, 198 is threaded and receives a nut 208, 210. Each of the members described above is preferably formed of steel. The knuckle joint 197, 199 center of gyration is noted at 212.

While certain dimensions are described below for an embodiment of the present invention, it is to be understood that these dimensions are merely exemplary, as the dimensions could be different depending upon the size and weight of the bridge, the expected earthquake activity of the area in which the bridge is located, etc.

The length of the second plate 168 of the first support 162, and of the first plate 180 of the second support 164 is about 1.37 m. The width of these plates 168, 180 is about 0.66 m, and the thickness is about 0.03 m. The length of the first plate 182 of the second support 164, and of the second plate 166 of the first support 162, is about 0.8 m, and the width thereof is about 0.35 m. The thickness of these plates is about 0.03 m. The height of each arm 172, 174, 186, 188 is about 1.3 m. The pendulum effective length "L" is about 1.5 m. As can be seen, by having the first and second supports 162 and 164 overlap along their heights, and by having them share a common pendular tension member or rod 194, the total height of the device can be kept rather small, which facilitates construction.

Figure 17:
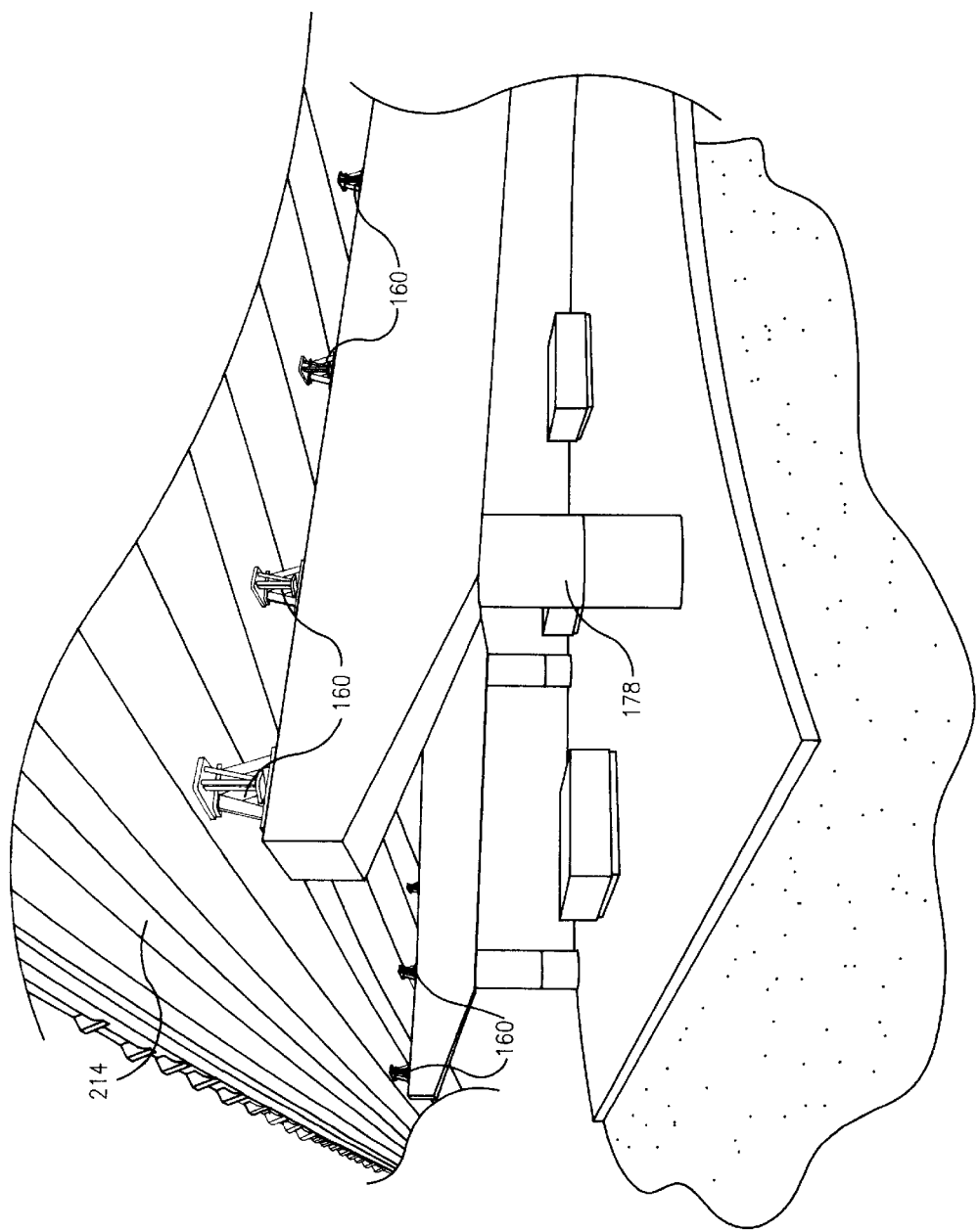
FIG. 17 is a perspective view of a bridge incorporating a plurality of spaced single rod isolators according to the second embodiment of the present invention.

FIG. 17 is a perspective view of a bridge 214 incorporating a plurality of spaced single rod pendular isolators 160 according to the second embodiment of the present invention described above. As can been seen, pendular isolators 160 are positioned between bridge beams 216 and the bridge piers 178.

As with the first embodiment described above relating to the floating slab, this second embodiment can also employ a level monitoring system like that shown in FIG. 13 described above, if desired. However, in the case of bridges and overpasses, the knuckle damping pendular isolation system 29 above would be adequate whenever dominant periods of the ground of less than one-second would be expected in case of an earthquake, as it happens, for instance, in most of northern California. These short dominant periods normally present themselves in firm ground, where no important settlements are to be expected. Therefore, a permanent level monitoring system would not normally be necessary. During installation and use, a level monitoring system, along with the threaded rods with nuts could be used to adjust the level of the bridge deck. If an adjustment in length of the double-knuckle fitted rods is required, however, it would usually be done at one of the rod ends only.

Figure 18:
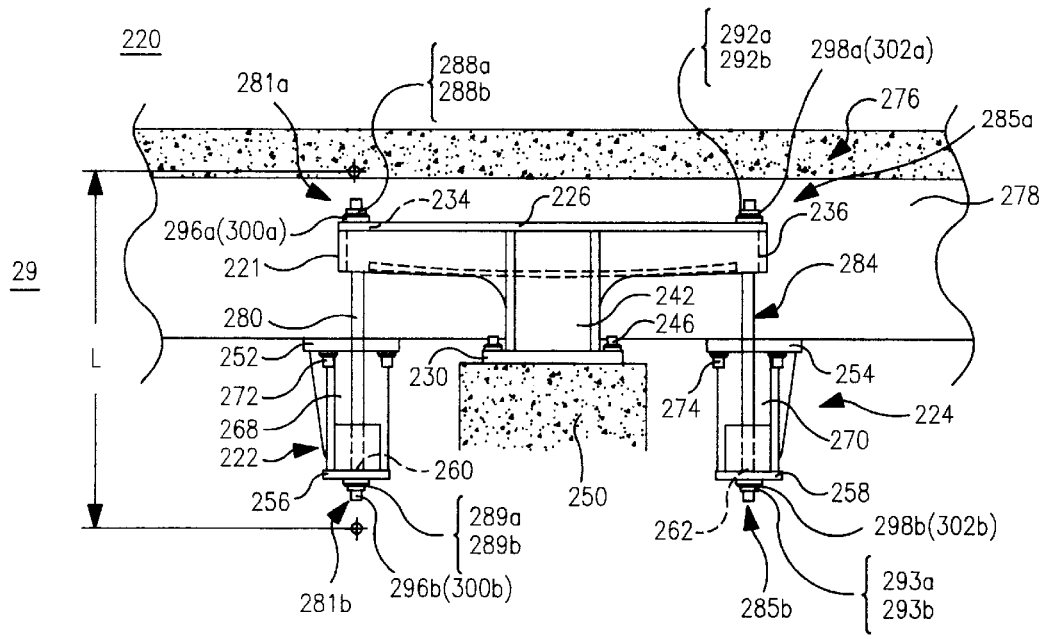
FIG. 18 is a side view of a third embodiment according to the present invention, including a four rod knuckle damping bridge seismic isolator.
Figure 19:
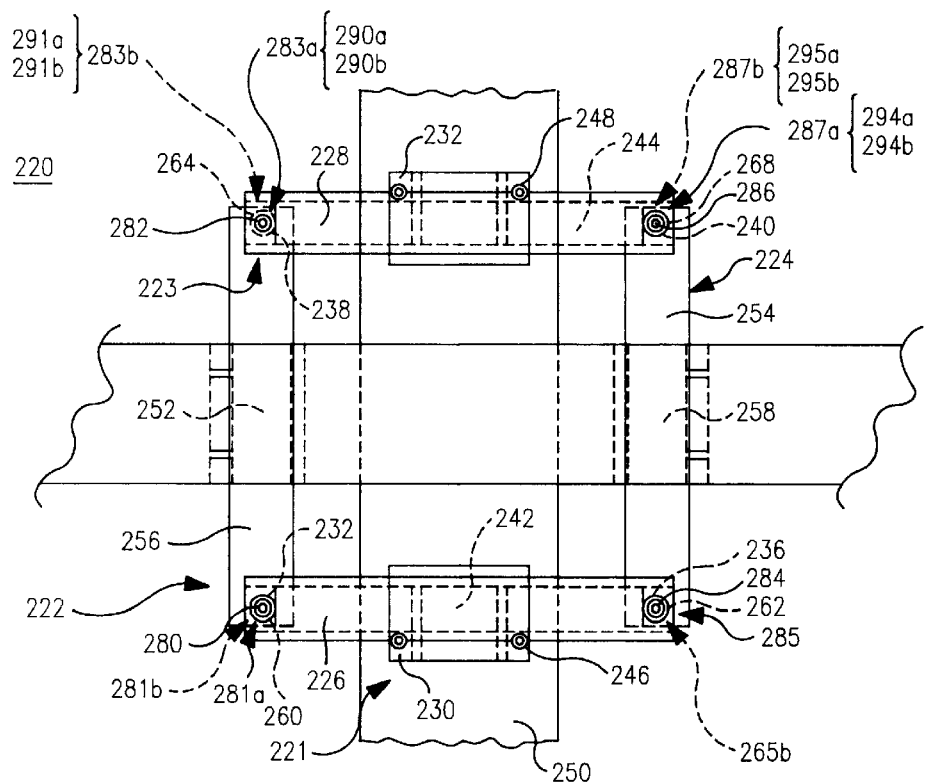
FIG. 19 is a top view of the four rod knuckle damping seismic isolator shown in FIG. 18.
Figure 20:
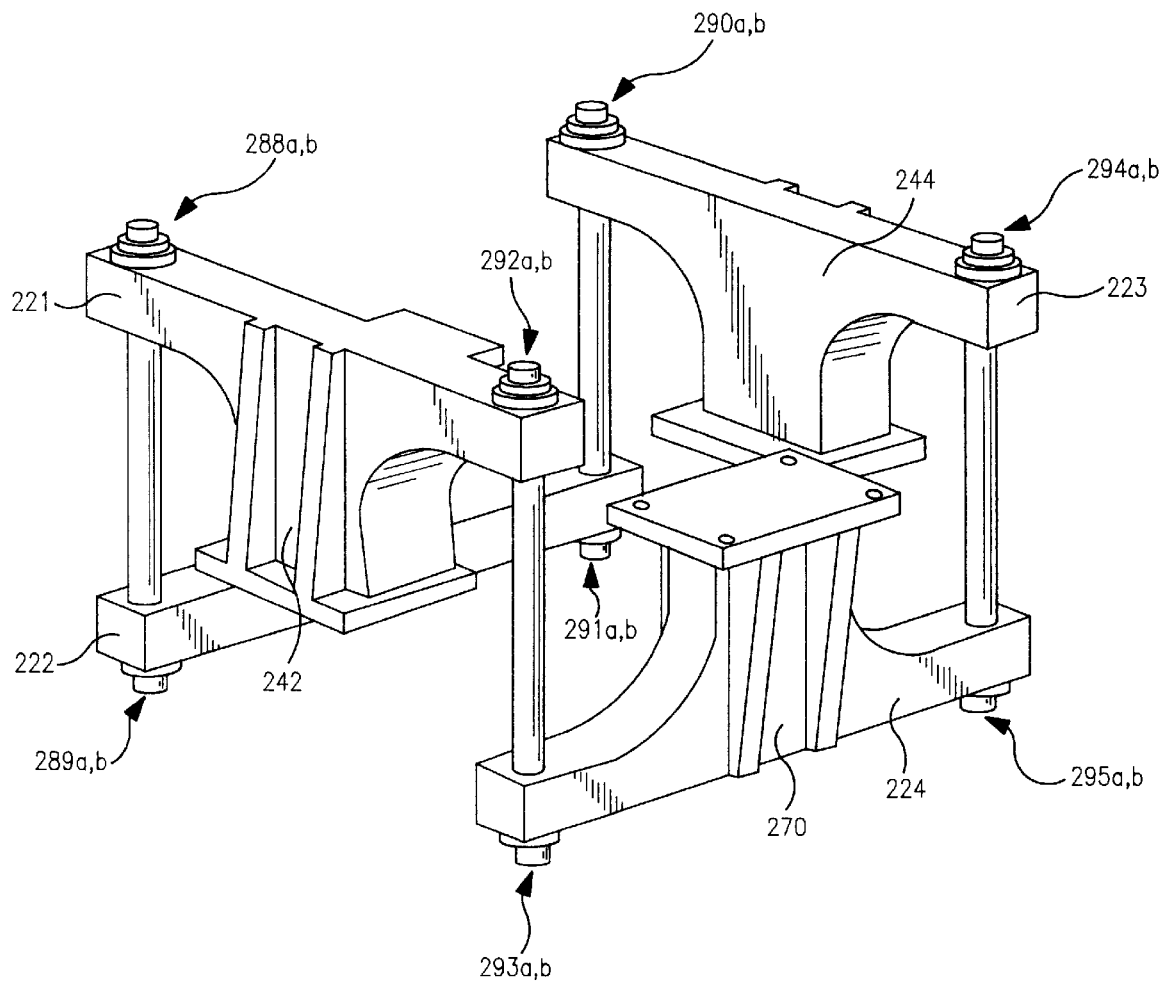
FIG. 20 is a perspective view of the isolator shown in FIGS. 18 and 19.

FIG. 18 is a side view of a third embodiment of the knuckle damping pendular isolation system 29 according to the present invention, and FIG. 19 is a top view thereof, wherein the bridge deck has been omitted for clarity purposes. FIG. 20 is a perspective view of the pendular isolator shown in FIGS. 18 and 19. As these views show, this third embodiment includes a four rod knuckle damping pendular isolator 220. This isolator 220 includes first through fourth supports 221, 222, 223, 224, which are generally identical, but pairs thereof are oriented inversely to each other. More particularly, the first and third supports 221 and 223 are positioned at the upper portion of the isolator 220, and are connected to inverted second and fourth supports 222 and 224.

The first and third supports 221, 223 each include a first, upper plate 226, 228 and a second opposite and lower plate 230, 232. Each plate 230 and 232 is rectangular, with the first plates 226, 228 being larger than the second plates 230, 232. Also, each of the first, upper plates 226, 228 includes two openings 234, 236 and 238, 240, respectively formed at the ends thereof for receiving rods 280, 282, 284, 286, as described below. The first and second plates 226, 228 and 230, 232 of the first and third supports 221, 223 are connected by a solid T-shaped body 242, 244. Each second plate 230, 232 is fixedly connected via a plurality of anchors 246, 248 to a member attached to the ground, and in this embodiment, a bridge pier 250. The first plates 226, 228 of the first and third supports 221, 223 are not fixed to either a member attached to the ground or a bridge deck beam, but are attached to the second and fourth supports 222 and 224, as described below.

The second and fourth supports 222, 224 also include a first, upper rectangular plate 252, 254 and a second opposite, lower and larger rectangular plate 256, 258. Each second, lower plate 256, 258 includes two spaced openings 260, 262 and 264, 266, respectively, one at each end thereof, for receiving the same rods 280, 282, 284, 286, as described below. These first and second plates 252, 254, 256, 258 are similarly connected by a T-shaped body 268, 270, albeit inverted relative to the "T" of the first and third supports 221, 223 shown in FIG. 18. The first, upper plates 252, 254 of the second and fourth supports 222 and 224 are fixedly connected via a plurality of anchors 272, 274 to a bridge deck 276 including a beam system, one beam 278 being shown.

Extending between the edges of the first and third supports 221, 223, and the second and fourth supports 222, 224 are the four steel rod pendular tension members 280, 282, 284, 286, which are received through the openings 260–266 formed in the first plates 226, 228 of the first and third supports 221, 223 and in the second lower plates 256, 258 of the second and fourth supports 222, 224. At each opposite end of each rod 280-286 there is formed a maintenance-free spherical thrust bearing or knuckle joint 281a, 281b, 283a, 283b, 285a, 285b, 287a and 287b, each including a knuckle element 288a, 289a, 290a, 291a, 292a, 293a, 294a, 295a, and a corresponding socket 288b, 289b, 290b, 291b, 292b, 293b, 294b, 295b, respectively, as described above. In addition, each rod end again is threaded and receives a nut 296a, 296b, 298a, 298b, 300a, 300b, 302a and 302b. Each of the members described above is preferably formed of steel.

The width of the bridge deck beam 278 is about 0.6 m. The width (as shown in FIG. 18) of the bridge pier 250 is about 0.08 m. The length of the first upper plates 226, 228 of the first and third supports 221, 223, as well as that of the second plates 256, 258 of the second and fourth supports 222, 224 is about 1.8 m. The height of each of the first through fourth supports is about 1.1 m. The "pendulum effective length," or "L," is again about 1.5 m. As can be seen, by having the first and third supports 221, 223 overlap with the second and fourth supports 222, 224 along their heights, and by having them share common pendular tension members or rods 280, 282, 284, 286 the pendulum effective length L can be kept rather compact, which facilitates construction.

Figure 21:
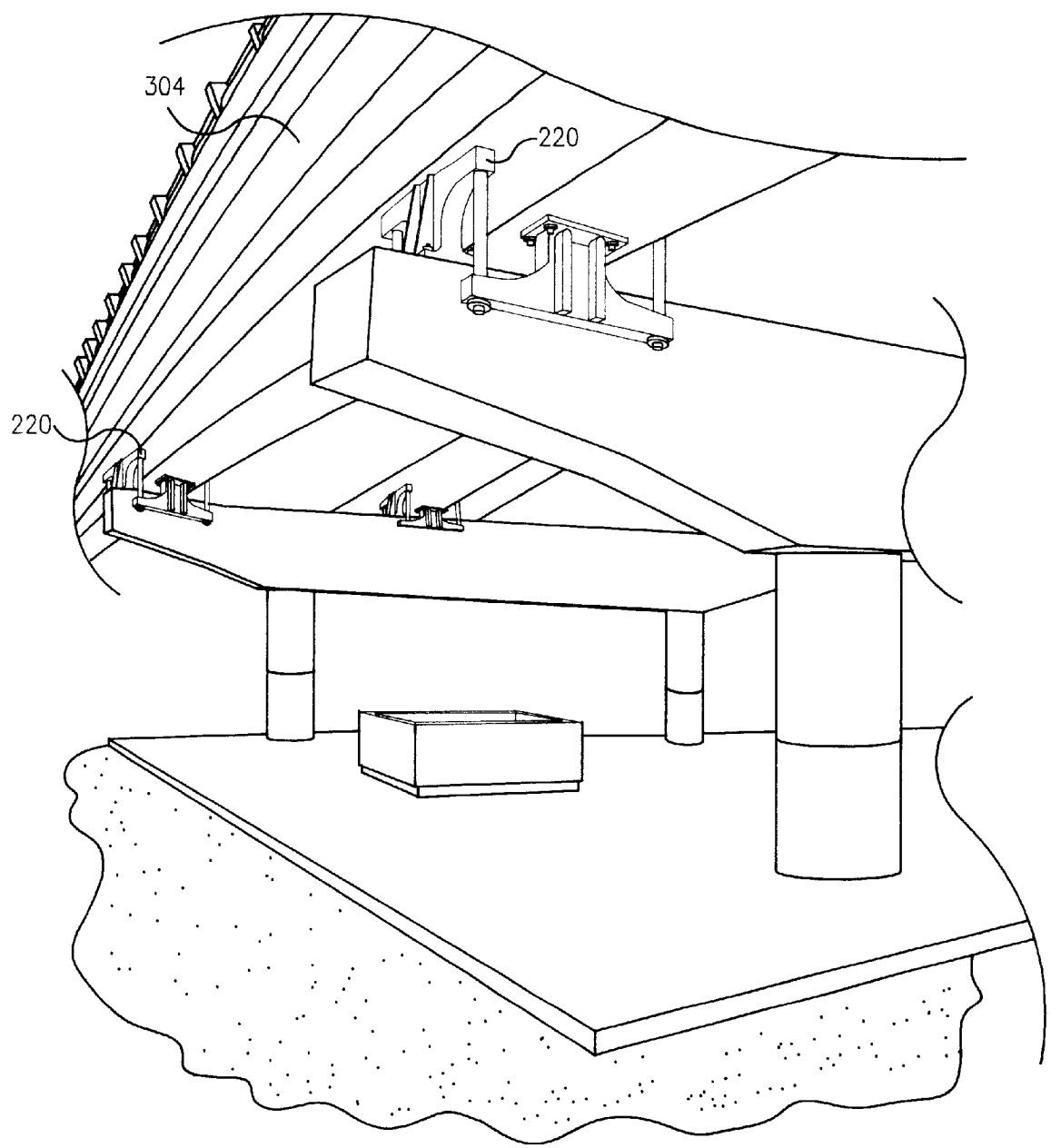
FIG. 21 is a perspective view of a bridge incorporating a plurality of spaced four rod isolators according to the third embodiment of the present invention.

FIG. 21 is a perspective view of a bridge 304 incorporating a plurality of spaced four rod isolators 220 according to the third embodiment of the present invention. As can been seen, pendular isolators can be positioned between the deck 305 and each bridge pier 250. Each isolator 220 would be identical.

Again, as with the first and second embodiments described above, this third embodiment can utilize a level monitoring system, if desired, although same usually would not be necessary. The bridge deck 276 can be leveled by adjusting the nuts as needed.

Through the use of this pendular isolator system in bridges or overpasses, such as the second and third embodiment described above, the following advantages can be achieved:

1.—Since the pendular length "L" is the same in all isolators, the system's damping forces, as well as the restoring forces are proportional to the vertical load W; therefore, no gyration of the bridge deck will be produced.
2.—Accelerations in the bridge deck could be reduced by 70% to 90% of ground accelerations.
3.—Horizontal residual displacement would be very small; it would be a random figure whose maximum value is given by the formula: Uo=+2μr
4.—By choosing the appropriate arrangement for the pendular isolators, the system could be employed successfully in new construction, as well as retrofitting existing bridges or overpasses. Retrofitting could be achieved without interrupting transit in the highway. Gradual loading of the pendular isolators could be done through the use of hydraulic jacks and the ensuing adjustment of the mechanical nuts, as discussed for the above-referenced slab embodiment.
5.—In many cases of new bridge construction, expansion joints could be entirely eliminated, while in long bridges, the spacing of expansion joints could be greatly increased.
6.—Pendular isolators can be fabricated easily in a shop, and installed later at a bridge construction work site.

Finally, the interlocking system described above in relation to the related patents, can be used when applying the invention described herein to tall buildings, especially when the horizontal forces generated by the wind are expected to be stronger than the friction forces of the knuckles. Also, in some specific circumstances, it may still be desirable to use a hydraulic damping system such as described in these patents.

Variations of these systems may be effectively implemented for similar applications and for many types of buildings, bridges and other structures. Accordingly, it will be apparent to those of skill in the art that the systems of the invention are subject to many modifications and adaptations and, thus, it is intended by the appended claims to encompass all such modifications and adaptations which fall within the true spirit and scope of the invention.

what is claimed is:

1. A structure stabilization system responsive to seismic disturbances, comprising:
   a first structural member adapted to be connected to the earth;
   a second structural member which is adapted to be movable relative to the earth, and which is to be stabilized; and
   a plurality of knuckle damping pendular isolators, each having a first portion connected to the first structural member and a second portion connected to the second structural member, each first and second portion including a spherical bearing having surface-to-surface frictional contact and whose radius and surface friction coefficient are pre-selected to provide a pre-selected damping necessary to stabilize the second structural member against the seismic disturbances.

2. The structure stabilization system as recited in claim 1, wherein the first structural member is a building structure, the second structural member is a planar member, the plurality of the pendular isolators includes a plurality of rods extending between the building and the planar member, and the first portion is at a first end of each rod connected to the building structure and the second portion is at a second end of each rod connected to the planar member.

3. The structure stabilization system as recited in claim 1, wherein the first structural member is a bridge pier, the second structural member is a bridge deck, and each of the plurality of pendular isolators includes a plurality of supports connected by at least one rod having two ends and extending between the pier and the deck, and each of the two ends of each rod include the spherical bearing.

4. The structure stabilization system as recited in claim 3, wherein each of the plurality of supports comprises:
   a first support having a first, upper plate and a second lower plate, the first plate including an opening, the first and second plates being connected by first and second arms, the second plate being fixedly connected to the bridge pier, a second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports, and the spherical bearing is a knuckle element received in a socket.

5. The structural stabilization system as recited in claim 4, wherein the ends of each rod are threaded, pass through the spherical bearing, and receive a nut.

6. The structure stabilization system as recited in claim 3, wherein each of the plurality of supports comprises:

first through fourth supports each including a first, upper plate and a second lower plate, the first, upper plate has two openings formed therein, the first and second plates are connected by a body, the second plate is fixedly connected to the bridge pier, the second and fourth supports include a first, upper plate and a second lower plate, the second, lower plate includes two openings formed therein, the first and second plates of the second support are connected by a body, the first, upper plates of the second and third supports are fixedly connected to the bridge deck, the at least one rod is four rods received through the openings formed in the first plates of the first and third supports and the second lower plates of the second and fourth supports, and the spherical bearing is a knuckle element received in a socket.

7. The structure stabilization system as recited in claim 6, wherein the ends of each rod are threaded, pass through the spherical bearing, and receive a nut.

8. The structure stabilization system as recited in claim 2, wherein the building structure is a building on a foundation connected to the ground, the planar structure is a floor slab in the building, the plurality of rods has upper ends connected to the building, and lower ends connected to the slab, the plurality of rods support the slab in suspension from the building while affording limited relative movement between the slab and the building, thereby to limit the transmission, to the slab, of movement of the foundation resultant from a seismic disturbance.

9. The structure stabilization system as recited in claim 1, further comprising:

a member associated with at least one of the first and second portions of the pendular isolators and being adjustable to level the second structural member.

10. The structure stabilization system as recited in claim 1, further comprising;

a monitoring system with plural monitoring sensors affixed to the second structural member to detect differential changes in the respective levels of the corresponding monitoring sensors.

11. A structure stabilization system responsive to seismic disturbances, comprising:

a first structural member adapted to be connected to the earth;

a second structural member which is adapted to be movable relative to the earth, and which is to be stabilized; and a knuckle damping pendular isolation system including a plurality of pendular isolators, each having a first portion connected to the first structural member and a second portion connected to the second structural member, each first and second portion including a knuckle joint having a hemispherical knuckle element and a corresponding socket in surface-to-surface contact, the radius and surface friction coefficient of the joint being pre-selected to provide a pre-selected damping necessary to stabilize the second structural member against the seismic disturbances.

12. The structure stabilization system as recited in claim 11, wherein the first structural member is a building structure, the second structural member is a planar member, the plurality of the pendular isolators includes a plurality of rods extending between the building and the planar member, and the first portion is at a first end of each rod connected to the building structure and the second portion is at a second end of each rod connected to the planar member.

13. The structure stabilization system as recited in claim 11, wherein the first structural member is a bridge pier, the second structural member is a bridge deck, and each of the plurality of pendular isolators includes a plurality of supports connected by the at least one rod having two ends and extending between the pier and the deck.

14. The structure stabilization system as recited in claim 13, wherein each of the plurality of supports comprises:

a first support having a first, upper plate and a second lower plate, the first plate including an opening, the first and second plates being connected by first and second arms, the second plate being fixedly connected to the bridge pier, the second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports.

15. The structural stabilization system as recited in claim 13, wherein the ends of each rod are threaded, pass through the knuckle joint and receive a nut.

16. The structure stabilization system as recited in claim 13, wherein each of the plurality of supports comprises:

first through fourth supports each including a first, upper plate and a second lower plate, the first, upper plate has two openings formed therein, the first and second plates are connected by a body, the second plate is fixedly connected to the bridge pier, the second and fourth supports include a first, upper plate and a second lower plate, the second, lower plate includes two openings formed therein, the first and second plates of the second support are connected by a body, the first, upper plates of the second and third supports are fixedly connected to the bridge deck, the at least one rod is four rods received through the openings formed in the first plates of the first and third supports and the second lower plates of the second and fourth supports.

17. The structure stabilization system as recited in claim 16, wherein the ends of each rod are threaded, pass through the knuckle joint and receive a nut.

18. The structure stabilization system as recited in claim 2, wherein the building structure is a building on a foundation connected to the ground, the planar structure is a floor slab in the building, the plurality of rods has upper ends connected to the building, and lower ends connected to the slab, the plurality of rods support the slab in suspension from the building while affording limited relative movement between the slab and the building, thereby to limit the transmission, to the slab, of movement of the foundation resultant from a seismic disturbance.

19. The structure stabilization system as recited in claim 11, further comprising:

a member associated with at least one of the first and second portions of the pendular isolators and being adjustable to level the second structural member.

20. A structure stabilization system responsive to seismic disturbances, comprising:
- a first structural member adapted to be connected to the earth;
- a second structural member which is adapted to be movable relative to the earth, and which is to be stabilized; and
- a plurality of knuckle damping pendular isolators, each having a length, a first portion connected to the first structural member and a second portion connected to the second structural member, each first and second portion including an axial knuckle joint having a convex hemispherical knuckle element and a corresponding concave socket in surface-to-surface contact, the length of each isolator and the radius and surface friction coefficient of the joint being pre-selected to provide a pre-selected damping necessary to stabilize the second structural member against the seismic disturbances.

21. The structure stabilization system as recited in claim 20, wherein the first structural member is a building structure, the second structural member is a planar member, the plurality of the pendular isolators includes a plurality of rods extending between the building and the planar member, and the first portion is at a first end of each rod connected to the building structure and the second portion is at a second end of each rod connected to the planar member.

22. The structure stabilization system as recited in claim 20, wherein the first structural member is a bridge pier, the second structural member is a bridge deck, and each of the plurality of pendular isolators includes a plurality of supports connected by the at least one rod having two ends and extending between the pier and the deck.

23. The structure stabilization system as recited in claim 22, wherein each of the plurality of supports comprises:
- a first support having a first, upper plate and a second lower plate, the first plate including an opening, the first and second plates being connected by first and second arms, the second plate being fixedly connected to the bridge pier, the second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports.

24. The structural stabilization system as recited in claim 23, wherein the ends of each rod are threaded, pass through the knuckle joint, and receive a nut.

25. The structure stabilization system as recited in claim 22, wherein each of the plurality of supports comprises:
- first through fourth supports each including a first, upper plate and a second lower plate, the first, upper plate has two openings formed therein, the first and second plates are connected by a body, the second plate is fixedly connected to the bridge pier, the second and fourth supports include a first, upper plate and a second lower plate, the second, lower plate includes two openings formed therein, the first and second plates of the second support are connected by a body, the first, upper plates of the second and third supports are fixedly connected to the bridge deck, the at least one rod is four rods received through the openings formed in the first plates of the first and third supports and the second lower plates of the second and fourth supports.

26. The structure stabilization system as recited in claim 25, wherein the ends of each rod are threaded, pass through the knuckle joint and receive a nut.

27. The structure stabilization system as recited in claim 21, wherein the building structure is a building on a foundation connected to the ground, the planar structure is a floor slab in the building, the plurality of rods has upper ends connected to the building, and lower ends connected to the slab, the plurality of rods support the slab in suspension from the building while affording limited relative movement between the slab and the building, thereby to limit the transmission, to the slab, of movement of the foundation resultant from a seismic disturbance.

28. The structure stabilization system as recited in claim 20, further comprising:
- a member associated with at least one of the first and second portions of the pendular isolators and being adjustable to level of the second structural member.

29. A structure stabilization system responsive to seismic disturbances, comprising:
- a first structural member adapted to be connected to the earth;
- a second structural member which is adapted to be movable relative to the earth, and which is to be stabilized; and
- a plurality of pendular isolators, each having a first portion connected to the first structural member and a second portion connected to the second structural member, each first and second portion including a spherical bearing whose radius and surface friction coefficient are selected to stabilize the second structural member against the seismic disturbances;
- wherein the first structural member is a bridge pier, the second structural member is a bridge deck, and each of the plurality of pendular isolators includes a plurality of supports connected by at least one rod having two ends and extending between the pier and the deck, and each of the two ends of each rod include the spherical bearing,
- wherein each of the plurality of supports comprises:
  - a first support having a first, upper plate and a second lower plate, the first plate including an opening, the first and second plates being connected by first and second arms, the second plate being fixedly connected to the bridge pier, a second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports, and the spherical bearing is a knuckle element received in a socket, and
- wherein the ends of each rod are threaded, pass through the spherical bearing, and receive a nut.

30. A structure stabilization system responsive to seismic disturbances, comprising:
- a first structural member adapted to be connected to the earth;
- a second structural member which is adapted to be movable relative to the earth, and which is to be stabilized; and
- a knuckle damping pendular isolation system including a plurality of pendular isolators, each having a first portion connected to the first structural member and a second portion connected to the second structural member, each first and second portion including a knuckle joint having a hemispherical knuckle element and a corresponding socket, the radius and surface friction coefficient of the joint being selected to stabilize the second structural member against the seismic disturbances, wherein the first structural member is a bridge pier, the second structural member is a bridge deck, and each of the plurality of pendular isolators includes a plurality of supports connected by the least one rod having two ends and extending between the pier and the deck, and wherein the ends of each rod are threaded, pass through the knuckle joint and receive a nut.

31. A structure stabilization system responsive to seismic disturbances, comprising:

a first structural member adapted to be connected to the earth;

a second structural member which is adapted to be movable relative to the earth, and which is to be stabilized; and a plurality of knuckle damping pendular isolators, each being elongated and having a first portion connected to the first structural member and a second portion connected to the second structural member, each first and second portion including an axial knuckle joint having a convex hemispherical knuckle element and a corresponding concave socket, the length of each isolator and the radius and surface friction coefficient of the joint being selected to stabilize the second structural member against the seismic disturbances, wherein the first structural member is a bridge pier, the second structural member is a bridge deck, and each of the plurality of pendular isolators includes a plurality of supports connected by the at least one rod having two ends and extending between the pier and the deck, wherein each of the plurality of supports includes a first support having a first, upper plate and a second lower plate, the first plate including an opening, the first and second plates being connected by first and second arms, the second plate being fixedly connected to the bridge pier, the second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports, and wherein the ends of each rod are threaded, pass through the knuckle joint, and receive a nut.

32. A structure stabilization system responsive to seismic disturbances, comprising:

a first structural member adapted to be connected to the earth;

a second structural member which is adapted to be movable relative to the earth, and which is to be stabilized; and a plurality of pendular isolators, each having a first portion connected to the first structural member and a second portion connected to the second structural member, each first and second portion including a spherical bearing whose radius and surface friction coefficient are selected to stabilize the second structural member against the seismic disturbances, wherein each of the plurality of pendular isolators includes at least one rod having two ends, and wherein the ends of each rod are threaded, pass through the spherical bearing, and receive a nut.

33. A structure stabilization system responsive to seismic disturbances, comprising:

a first structural member adapted to be connected to the earth;

a second structural member which is adapted to be movable relative to the earth, and which is to be stabilized; and a knuckle damping pendular isolation system including a plurality of pendular isolators, each having a first portion connected to the first structural member and a second portion connected to the second structural member, each first and second portion including a knuckle joint having a hemispherical knuckle element and a corresponding socket, the radius and surface friction coefficient of the joint being selected to stabilize the second structural member against the seismic disturbances, wherein each of the plurality of pendular isolators includes a plurality of supports connected by the at least one rod having two ends, and wherein the ends of each rod are threaded, pass through the knuckle joint and receive a nut.

34. A structure stabilization system responsive to seismic disturbances, comprising:

a first structural member adapted to be connected to the earth;

a second structural member which is adapted to be movable relative to the earth, and which is to be stabilized; and a plurality of knuckle damping pendular isolators, each being elongated and having a first portion connected to the first structural member and a second portion connected to the second structural member, each first and second portion including an axial knuckle joint having a convex hemispherical knuckle element and a corresponding concave socket, the length of each isolator and the radius and surface friction coefficient of the joint being selected to stabilize the second structural member against the seismic disturbances, wherein each of the plurality of pendular isolators includes a plurality of supports connected by the at least one rod having two ends, wherein the ends of each rod are threaded, pass through the knuckle joint, and receive a nut.

35. A structure stabilization system responsive to seismic disturbances, consisting of:

a first structural member adapted to be connected to the earth;

a second structural member which is adapted to be movable relative to the earth, and which is to be stabilized; and a plurality of pendular isolators, each having a first portion connected to the first structural member and a second portion connected to the second structural member, each first and second portion including a spherical bearing whose radius and surface friction coefficient are selected to stabilize the second structural member against the seismic disturbances, wherein each of the plurality of pendular isolators includes at least one rod having two ends, and wherein the ends of each rod are threaded, pass through the spherical bearing, and receive a nut.

36. A structure stabilization system responsive to seismic disturbances, consisting of:
- a first structural member adapted to be connected to the earth;
- a second structural member which is adapted to be movable relative to the earth, and which is to be stabilized; and
- a knuckle damping pendular isolation system including a plurality of pendular isolators, each having a first portion connected to the first structural member and a second portion connected to the second structural member, each first and second portion including a knuckle joint having a hemispherical knuckle element and a corresponding socket, the radius and surface friction coefficient of the joint being selected to stabilize the second structural member against the seismic disturbances,
- wherein each of the plurality of pendular isolators includes a plurality of supports connected by the at least one rod having two ends, and
- wherein the ends of each rod are threaded, pass through the knuckle joint and receive a nut.

37. A structure stabilization system responsive to seismic disturbances, consisting of:
- a first structural member adapted to be connected to the earth;
- a second structural member which is adapted to be movable relative to the earth, and which is to be stabilized; and
- a plurality of knuckle damping pendular isolators, each being elongated and having a first portion connected to the first structural member and a second portion connected to the second structural member, each first and second portion including an axial knuckle joint having a convex hemispherical knuckle element and a corresponding concave socket, the length of each isolator and the radius and surface friction coefficient of the joint being selected to stabilize the second structural member against the seismic disturbances,
- wherein each of the plurality of pendular isolators includes a plurality of supports connected by the at least one rod having two ends,
- wherein the ends of each rod are threaded, pass through the knuckle joint, and receive a nut.

38. A structure stabilization system responsive to seismic disturbances, comprising:
- a first structural member adapted to be connected to the earth;
- a second structural member which is adapted to be movable relative to the earth, and which is to be stabilized; and
- a plurality of pendular isolators, each having a first portion connected to the first structural member and a second portion connected to the second structural member, each first and second portion including a spherical bearing whose radius and surface friction coefficient are pre-selected to provide sufficient damping to stabilize the second structural member against the seismic disturbances;
- wherein the first structural member is a bridge pier, the second structural member is a bridge deck, and each of the plurality of pendular isolators includes a plurality of supports connected by at least one rod having two ends and extending between the pier and the deck, and each of the two ends of each rod include the spherical bearing;
- wherein each of the plurality of supports includes:
  - a first support having a first, upper plate and a second lower plate, the first plate including an opening, the first and second plates being connected by first and second arms, the second plate being fixedly connected to the bridge pier, a second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports, and the spherical bearing is a knuckle element received in a socket, and
- wherein the ends of each rod are threaded, pass through the spherical bearing, and receive a nut.

39. A structure stabilization system responsive to seismic disturbances, comprising:
- a first structural member adapted to be connected to the earth;
- a second structural member which is adapted to be movable relative to the earth, and which is to be stabilized; and
- a knuckle damping pendular isolation system including a plurality of pendular isolators, each having a first portion connected to the first structural member and a second portion connected to the second structural member, each first and second portion including a knuckle joint having a hemispherical knuckle element and a corresponding socket, the radius and surface friction coefficient of the joint being pre-selected to provide sufficient damping to stabilize the second structural member against the seismic disturbances,
- wherein the first structural member is a bridge pier, the second structural member is a bridge deck, and each of the plurality of pendular isolators includes a plurality of supports connected by the at least one rod having two ends and extending between the pier and the deck, and
- wherein the ends of each rod are threaded, pass through the knuckle joint and receive a nut.

40. A structure stabilization system responsive to seismic disturbances, comprising:
- a first structural member adapted to be connected to the earth;
- a second structural member which is adapted to be movable relative to the earth, and which is to be stabilized; and
- a plurality of knuckle damping pendular isolators, each having a length, a first portion connected to the first structural member and a second portion connected to the second structural member, each first and second portion including an axial knuckle joint having a convex hemispherical knuckle element and a corresponding concave socket, the length of each isolator and the radius and surface friction coefficient of the joint being pre-selected to provide sufficient damping to stabilize the second structural member against the seismic disturbances,
- wherein the first structural member is a bridge pier, the second structural member is a bridge deck, and each of the plurality of pendular isolators includes a plurality of supports connected by the at least one rod having two ends and extending between the pier and the deck, wherein each of the plurality of supports includes:
a first support having a first, upper plate and second lower plate, the first plate including an opening, the first and second plates being connected by first and second arms, the second plate being fixedly connected to the bridge pier, the second support having a first, upper plate and a second lower plate, the second plate including an opening, the first and second plates of the second support being connected by first and second arms, the first upper plate of the second support being fixedly connected to the bridge deck, and the at least one rod is a single rod received through the openings formed in the first and second supports, and wherein the ends of each rod are threaded, pass through the knuckle joint, and receive a nut.

* * * * *